United States Patent
Müller-Rees et al.

(10) Patent No.: US 7,401,817 B2
(45) Date of Patent: Jul. 22, 2008

(54) INVISIBLE, MACHINE-DETECTABLE SECURITY MARKING, PRODUCTION OF THE SECURITY MARKING, AND SECURITY SYSTEM COMPRISING THIS SECURITY MARKING

(75) Inventors: Christoph Müller-Rees, Pullach (DE); Jürgen Küpfer, München (DE); Horst Leigeber, Oberhaching (DE); Georg Schwalb, München (DE)

(73) Assignee: Sicpa Holding S.A., Prilly (CH)

( * ) Notice: Subject to any disclaimer, the term of this patent is extended or adjusted under 35 U.S.C. 154(b) by 1006 days.

(21) Appl. No.: 10/299,239

(22) Filed: Nov. 19, 2002

(65) Prior Publication Data
US 2003/0173539 A1    Sep. 18, 2003

Related U.S. Application Data

(63) Continuation of application No. 09/129,941, filed on Aug. 6, 1998, now abandoned.

(30) Foreign Application Priority Data
Aug. 28, 1997    (DE) ................. 197 37 612

(51) Int. Cl.
*G06K 9/00*    (2006.01)
*G07D 7/12*    (2006.01)
(52) U.S. Cl. ............... 283/72; 283/88; 283/89; 283/91; 252/587; 252/588; 270/52.02

(58) Field of Classification Search ................ 428/1.31, 428/0.131; 270/52.02; 283/72, 88–89, 91, 283/109, 113; 252/299.01, 585, 587–589
See application file for complete search history.

(56) References Cited

U.S. PATENT DOCUMENTS

| | | | |
|---|---|---|---|
| 3,720,456 A | | 3/1973 | Adams et al. |
| 4,293,435 A | * | 10/1981 | Portugall et al. ....... 252/299.01 |
| 4,637,896 A | | 1/1987 | Shannon |
| 4,699,511 A | | 10/1987 | Seaver |
| 4,749,254 A | | 6/1988 | Seaver |
| 5,054,487 A | | 10/1991 | Clarke |
| 5,122,907 A | | 6/1992 | Slocum |
| 5,211,877 A | | 5/1993 | Andrejewski et al. |

(Continued)

FOREIGN PATENT DOCUMENTS

DE    3942663    6/1991

(Continued)

OTHER PUBLICATIONS

Tissue, Electromagnetic Spectrum, http://www.chem.vt.edu-ed/light/em-spec.html, updated May 28, 2004.*

(Continued)

*Primary Examiner*—Terrel Morris
*Assistant Examiner*—Sophie Hon
(74) *Attorney, Agent, or Firm*—Brooks Kushman P.C.

(57) ABSTRACT

The invention relates to a security marking whose level of proof against forgery is greater than that of known security markings, comprising liquid-crystalline material with chiral phase, wherein the security marking is imperceptible to the eye and the properties of the liquid-crystalline material with chiral phase can be detected with the aid of detection systems.

12 Claims, 6 Drawing Sheets

U.S. PATENT DOCUMENTS

| | | | |
|---|---|---|---|
| 5,362,315 A | 11/1994 | Mueller-Rees et al. | |
| 5,372,387 A | 12/1994 | Wajda | |
| 5,605,649 A * | 2/1997 | Stohrer et al. | 252/299.01 |
| 5,629,055 A * | 5/1997 | Revol et al. | 428/1.31 |
| 5,678,863 A | 10/1997 | Knight et al. | |
| 5,683,622 A | 11/1997 | Uratzschmar et al. | |
| 5,695,680 A | 12/1997 | Weitzel et al. | |
| 5,827,449 A | 10/1998 | Hanelt et al. | |
| 5,872,630 A | 2/1999 | Johs et al. | |
| 6,570,648 B1 * | 5/2003 | Muller-Rees et al. | 356/71 |
| 6,643,001 B1 * | 11/2003 | Faris | 356/37 |
| 6,734,936 B1 * | 5/2004 | Schadt et al. | 349/117 |

FOREIGN PATENT DOCUMENTS

| | | |
|---|---|---|
| DE | 4234845 | 4/1994 |
| DE | 3732115 | 5/1996 |
| DE | 19544130 | 5/1997 |
| DE | 19541028 | 1/1998 |
| EP | 0358208 | 3/1994 |
| EP | 0606940 | 7/1994 |
| EP | 0601483 | 9/1995 |
| EP | 0685749 | 12/1995 |
| GB | 2268906 | 1/1994 |
| GB | 2282145 | 3/1995 |
| JP | 8146416 | 6/1996 |
| WO | WO 8202445 | 7/1982 |
| WO | WO 95/08786 | 5/1995 |
| WO | WO 9524454 | 9/1995 |

OTHER PUBLICATIONS

Derwent Abstract (#91-231516[32]) corresponding to DE 3,942,663.

Derwent Abstract (#96-324860 [33]) corresponding to JP 08 146416.

Derwent Abstract (#89-107367 [15]) corresponding to DE 3,732,115.

Derwent Abstract (#97-247405 [23]) corresponding to DE 19541028.

Derwent Abstract (#91-231516 [32]) corresponding to DE 3,942,663.

Derwent Abstract (#97-290514 [27]) corresponding to DE 19544130.

* cited by examiner

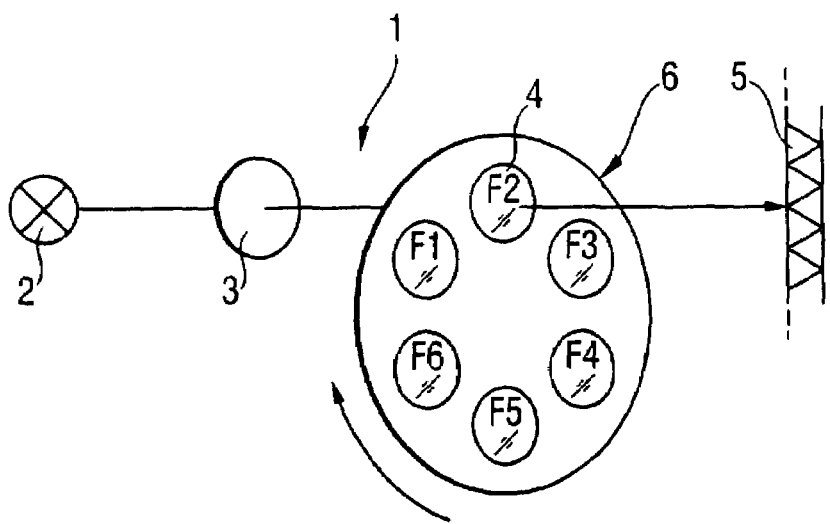
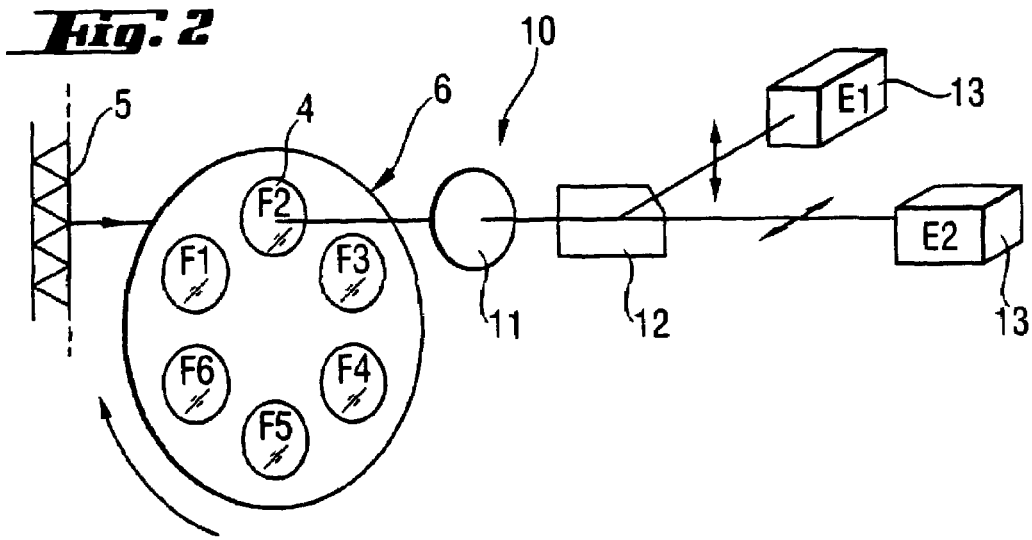
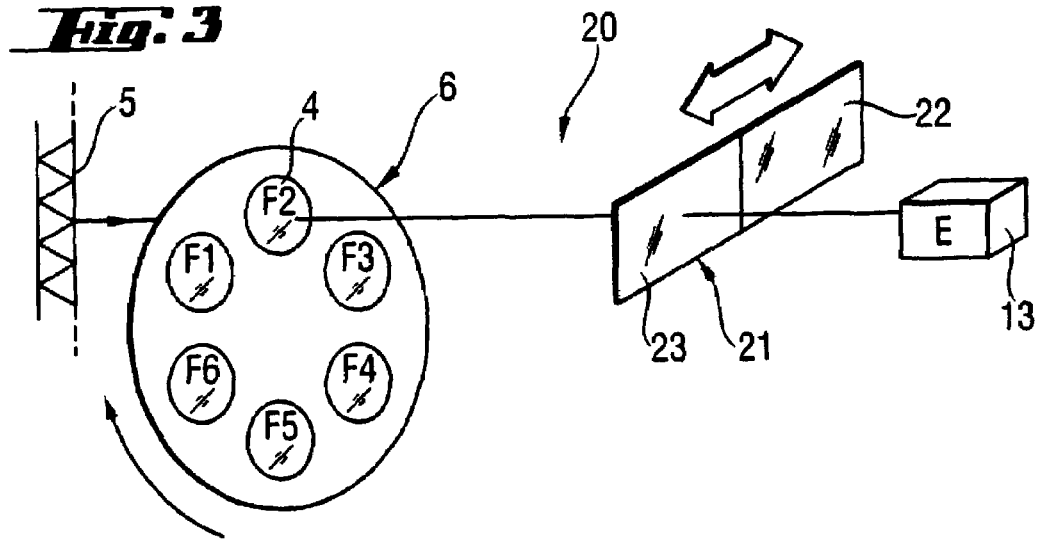

INVISIBLE, MACHINE-DETECTABLE SECURITY MARKING, PRODUCTION OF THE SECURITY MARKING, AND SECURITY SYSTEM COMPRISING THIS SECURITY MARKING

This application is a continuation of U.S. application Ser. No. 09/129,941, filed Aug. 6, 1998, now abandoned.

TECHNOLOGICAL FIELD

The invention relates to a machine-detectable security marking which is invisible, i.e. imperceptible to the eye, to the production of the security marking and to a security system comprising this security marking.

DESCRIPTION OF THE RELATED ART

The growing technical maturity of color copiers is leading to copies whose color, resolution and quality are increasingly difficult to distinguish from the originals. As protection against forgery using color copiers or scanners, the use of optically variable elements is becoming more and more widespread as a security marking for data carriers. A common feature of such markings is that the color or brightness they present varies depending on the conditions under which they are illuminated and observed. The most common optically variable security markings include diffraction gratings, holograms, interference coatings, metameric inks and polarizing coatings.

DE 195 41 028 describes effect coating materials for articles that are to be coated, comprising liquid-crystal pigments, which carry a label for recognition and characterization of the article. Labeling in this case is via the surface structure of the pigments with a layer thickness of >0.5 µm, in accordance with the barcode principle, or by defined spectral characteristics or by color patterns. Also described are processes for producing the effect coating material and the marked pigments.

DE 3942 663 discloses data carriers with an optically variable security element. The security element comprises a liquid-crystalline material comprising liquid-crystal polymer in oriented form at room temperature, which is present as a solid. DE 3942 663 discloses the use of liquid-crystalline polymer systems having lattice constants of 300-1000 nm, which with an average refractive index of normally 1.5 for liquid-crystalline materials gives a reflection wavelength of from 450 to 1500 nm for the liquid-crystalline material. Also disclosed is the optional combination of the LC system with "conventional inks", and also semi-finished articles and processes for producing the security elements, and also methods and mechanical test setups for detecting color, color flop and polarization of the security elements. The center wavelength test performed therein is inadequate for an increased level of proof against forgery. This is demonstrated in the comparative example of the present application.

DE 19544130 discloses optically variable security elements comprising at least two printed-on layers. The first printed-on layer is structured, with a color contrasting with the data carrier, and the second printed-on layer is configured with optically variable pigments, with little or no mass tone, and is at least partly superimposed on the first printed-on layer. A description is also given of preparation techniques for optically variable security elements of this kind.

SUMMARY OF THE INVENTION

It is an object of the invention to provide security markings whose level of proof against forgery is greater than that of known security markings.

This object is achieved by a security marking comprising liquid-crystalline material with chiral phase, wherein the security marking is invisible to the eye, and the properties of the liquid-crystalline material with chiral phase can be detected with the aid of detection devices.

Owing to the imperceptibility of the security marking to the human eye as a result of the transparency of the liquid-crystalline material with chiral phase, the existence and/or position of said marking on the marked article is difficult if not impossible for forgers to perceive, so that the complex properties of polarization-color-color flop, which can be detected position-dependently by a detection device, lead to a security marking which has a high level of proof against forgery. The invention also relates to articles labeled with the security marking of the invention.

Preferably, the marking of the invention, which is difficult if not impossible for forgers to perceive, exhibits different, machine-detectable properties at defined positions of the marked article. This combination increases still further the level of proof against forgery. The invention hence also relates to articles which are labeled with the security marking of the invention in such a way that the security marking of the invention has different, machine-detectable properties at defined positions of the marked article. The security marking of the invention can only be reproduced with a level of complexity which is substantially higher than that of prior art markings, which again increases the level of proof against forgery.

The liquid-crystalline material with chiral phase that is present in the security marking of the invention is selected such that the longwave flank of the reflection band of the liquid-crystalline material with chiral phase lies preferably in the range from 200 to 420 nm or the shortwave flank of the reflection band of the liquid-crystalline material with chiral phase lies preferably in the range from 700 to 3000 nm. With particular preference, the longwave flank of the reflection band of the liquid-crystalline material with chiral phase lies in the range from 250 to 420 nm or the shortwave flank of the reflection band of the liquid-crystalline material with chiral phase lies in the range from 1501 to 3000 nm. With especial preference, the longwave flank of the reflection band of the liquid-crystalline material with chiral phase lies in the range from 300 to 400 nm or the shortwave flank of the reflection band of the liquid-crystalline material with chiral phase lies in the range from 1501 to 2500 nm.

The security marking of the invention can be a uniform marking of a liquid-crystalline material with chiral phase, a structured or unstructured security marking of at least two different liquid-crystalline materials with chiral phase, a security marking of liquid-crystalline pigments which are incorporated in a liquid-crystalline film, or a three-dimensional arrangement of a uniform liquid-crystalline material.

Liquid-crystalline materials with chiral phase which can be used to produce security markings of the invention are known from the prior art—for example, from the documents specified in Examples 1.1 to 1.5.

The invention also relates to the use of liquid-crystalline materials with chiral phase whose longwave flank of the reflection band lies in the range from 200 to 420 nm or whose shortwave flank of the reflection band lies in the range from 700 to 3000 nm for producing a security marking.

The invention also relates to processes for producing the security markings of the invention and to a security system comprising the security marking of the invention and a test setup for recognizing the security marking.

BRIEF DESCRIPTION OF DRAWINGS

FIG. 1 shows an illumination source.
FIG. 2 shows a detection system with color selection and polarization selection.
FIG. 3 shows a detection setup with only one receiver.

DETAILED DESCRIPTION OF THE INVENTION

Figure 4:
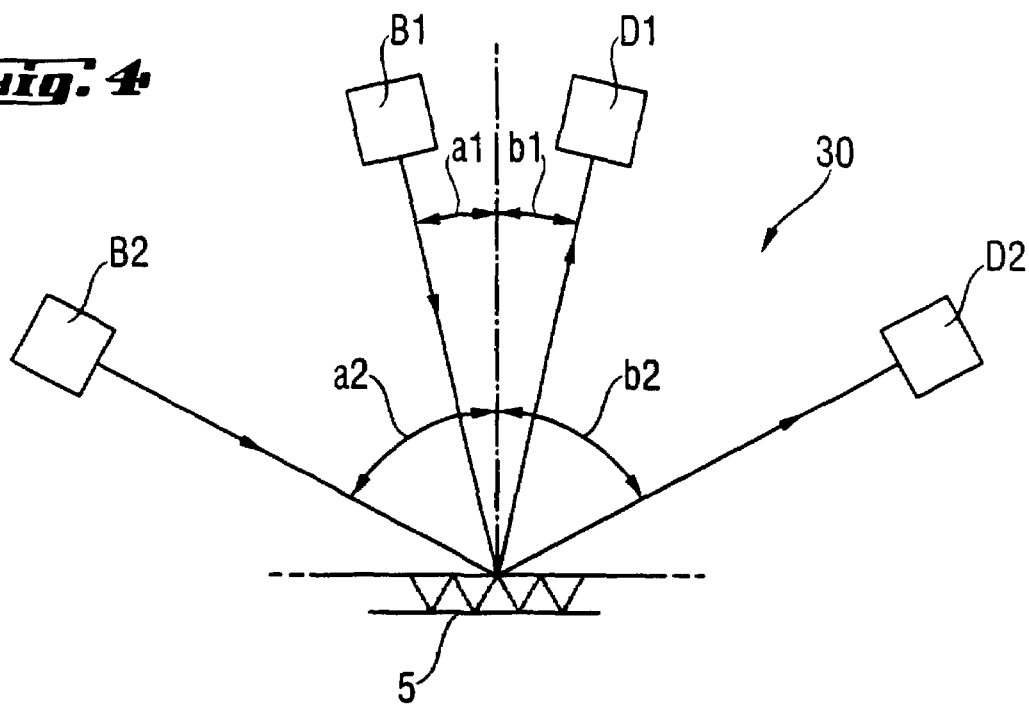
FIG. 4 shows an embodiment of test setup 1.

The markings of the invention can be produced as described, for example, in the examples. The security marking can also be produced, inter alia, by multicoat techniques. For the purposes of the present invention, the following terms are defined as described below:

Center wavelength and bandwidth of a reflection band may be determined from a plot of the intensity of a reflection band as a function of the wavelength, as follows:

The value of the maximum intensity of a reflection band is halved.

A connecting line parallel to the x-axis (wavelength scale) at the level of the halved intensity intersects the reflection band at a shortwave position and a longwave position. The distance between these two intersects parallel to the x-axis is the bandwidth of the reflection band.

The center wavelength of the reflection band is obtained by drawing a line parallel to the y-axis to the x-axis at the midpoint of the reflection band bandwidth. The center wavelength corresponds to the wavelength value obtained at the intersect of these parallels with the reflection band.

Polarization: liquid-crystalline materials with chiral phase have a left- or right-handed helical structure. The wavelength-selectively reflected light undergoes left- or right-handedly circular polarization and is accordingly denoted below as lh or rh.

Flank of the reflection band: the wavelength at which the intensity of the reflection band has dropped to 10% of its maximum. The "shortwave flank of the reflection band" corresponds to the wavelength at which the shortwave branch, and the "longwave flank of the reflection band" to the wavelength at which the longwave branch, has dropped to 10% of the maximum intensity.

By color is meant not only the perceived color of the wavelength range of visible light that can be perceived by the human eye but also the color in the adjacent UV and IR wavelength regions that is imperceptible to the human eye but can be measured by means of known instruments such as UV and IR spectrometers.

Color flop: spectral color shift of the reflected/transmitted light when light incidence is nonperpendicular. The extent of the flop at a given angular configuration is a material-specific property determined by the average refractive index of the liquid-crystalline molecules. It can be calculated in accordance with the formula described in DE 3732115:

$$\lambda(a) = \lambda(0) \cdot \cos[\arcsin(\sin(a/n))] \qquad (1)$$

The security elements of the invention are preferably constructed by one or more of numerous techniques such as: a uniform security marking of one liquid-crystalline species, a structured security marking of at least two different liquid-crystalline species, an unstructured security marking of at least two different liquid-crystalline species, a security marking produced by multicoat techniques, a security marking of liquid-crystalline material into which liquid-crystalline pigments are incorporated, or a three-dimensional arrangement of a uniform liquid-crystalline material in a security marking.

Table 1 summarizes the selection of liquid-crystalline materials with chiral phase described in the examples and also processes for producing security markings of the invention from these materials under the abovementioned generic terms.

TABLE 1

| Group code for type of security marking | Liquid-crystalline material with chiral phase used | | Production of security marking by whole-area application according to Example | Production of security marking from LC pigments according to Examples |
|---|---|---|---|---|
| | Wavelength range of the material according to Example | Rotational sense of the circularly polarized reflected light | | |
| I Uniform security marking of one liquid-crystalline species | | | | |
| I1 | 2.1 | rh or lh | 3.1 | 3.21, 3.22 |
| I2 | 2.2 | rh or lh | 3.1 | 3.21, 3.22 |
| I3 | 2.3 | rh or lh | 3.1 | 3.21, 3.22 |
| I4 | 2.4 | rh or lh | 3.1 | 3.21, 3.22 |
| II Structured security marking of at least two different liquid-crystalline species | | | | |
| II1 | 2.5 | Material 1: rh | 3.2, 3.3 | 3.23, 3.24 |

TABLE 1-continued

| Group code for type of security marking | Liquid-crystalline material with chiral phase used | | Production of security marking by whole-area application according to Example | Production of security marking from LC pigments according to Examples |
|---|---|---|---|---|
| | Wavelength range of the material according to Example | Rotational sense of the circularly polarized reflected light | | |
| II2 | 2.6 | Material 2: lh<br>Material 1: rh or lh<br>Material 2: rh or lh | 3.4, 3.5 | 3.25, 3.26 |
| II3 | 2.7 | Material 1: rh<br>Material 2: lh | 3.6, 3.7 | 3.27, 3.28 |
| III Unstructured security marking of at least two different liquid-crystalline species | | | | |
| III1 | 2.5 | Material 1: rh<br>Material 2: lh | — | 3.29, 3.30 |
| III2 | 2.6 | Material 1: rh or lh<br>Material 2: rh or lh | — | 3.31, 3.32 |
| III3 | 2.7 | Material 1: rh<br>Material 2: lh | — | 3.33, 3.34 |
| IV Security marking by multicoat technique | | | | |
| IV1 | 2.5 | Material 1: rh<br>Material 2: lh | 3.10, 3.11 | 3.40–3.43 |
| IV2 | 2.6 | Material 1: rh or lh<br>Material 2: rh or lh | 3.12, 3.13 | 3.44–3.47 |
| IV3 | 2.7 | Material 1: rh<br>Material 2: lh | 3.14, 3.15 | 3.48–3.51 |
| V Security marking of liquid-crystalline material into which liquid-crystalline pigments are incorporated | | | | |
| V1 | 2.5 | Material 1: rh<br>Material 2: lh | 3.17 | 3.52, 3.53 |
| V2 | 2.6 | Material 1: rh or lh<br>Material 2: rh or lh | 3.18 | 3.54, 3.55 |
| V3 | 2.7 | Material 1: rh<br>Material 2: lh | 3.19 | 3.56, 3.57 |
| VI Three-dimensional arrangement of a uniform liquid-crystalline material in security marking | | | | |
| VI1 | 2.1, 2.2, 2.3, 2.4 | rh or lh | 3.20 | 3.58, 3.59 |

The process for producing the security markings of the invention comprises subjecting liquid-crystalline materials with chiral phase whose longwave flank of the reflection band lies in the range from 200 to 420 nm or whose shortwave flank of the reflection band lies in the range from 700 to 3000 nm either to direct application to a support material in a whole-area application procedure or first to processing to form pigments which are then applied to a support material in this form or incorporated into a material.

The security system of the invention is a combination of an invisible liquid-crystalline material with chiral phase, which has been processed to give a forgery-proof security marking, with a test setup for preferably complete identification of the properties which are characteristic of the liquid-crystalline materials and are selected as relevant for the security marking. Properties selected as relevant are preferably the handedness, the color or the color flop of the respective liquid-crystalline material with chiral phase or the defined arrangement of the material.

The color is determined by measuring the form of the reflection band of the liquid-crystalline material with chiral phase. The color flop is determined by measuring at least two center wavelengths, determined at different angular configurations, of the reflection band of the liquid-crystalline material with chiral phase. The handedness of the material is determined by measuring the polarization of the light reflected from the liquid-crystalline material with chiral phase. The defined arrangement of the material is determined by measuring the abovementioned properties separately for each liquid-crystalline component of the material.

Since known test setups do not fully utilize the possibilities of LC security markings (see comparative example), it is a further object of the invention to provide a test setup which provides highly sensitive detection of the properties of the liquid-crystalline material with chiral phase (also called LC material or LC species below) that are selected in each case for the security marking. The test setup of the invention detects the characteristic form of the reflection band by determining the intensity of reflection at at least two spectrally different points of the reflection band.

Preferably, the test setup of the invention detects the characteristic form of the reflection band by carrying out measurement at the center (center wavelength) of the reflection band and in the wavelength range where the intensity of the reflection band reaches less than 50% of its maximum. With particular preference, the test setup of the invention detects the characteristic form of the reflection band by carrying out measurement at the center (center wavelength) of the reflection band and in the wavelength range of the reflection band where the intensity of the reflection band is less than 10% of its maximum.

For the purposes of the invention the term test setup means an arrangement in which the security marking is illuminated by one or more lighting units and the light reflected or transmitted by the security marking is tested in one or more detection units. A lighting unit (B, B1, B2, B3) consists of a light source and optionally an imaging system (for example a condenser), one or more wavelength-selective elements, such as color filters and heat filters, and also, if desired, optical waveguides. The selection and number of the filters depends on the test setup used and on the security marking to be tested and is described in detail with respect to the test setups.

The selection of the light sources is described as follows. A distinction is made between directed lighting units, characterized by an illumination-side aperture angle of <10°, and diffuse lighting units, which can be realized, for example, by using an Ulbricht cone, with illumination-side aperture angles of >10°. Lighting units which can be employed with preference in the test setup of the invention are:

LU1: Lighting Unit 1 with Beam Focusing and Color Selection

This directed lighting unit consists of a light source 2, a condenser 3, and one or more wavelength-selective elements 4. An illumination system of this kind is shown by way of example in FIG. 1. The light that falls on the security marking 5 undergoes spectral selection by color filters 4. This selection takes place, for example, by the filters being arranged, as depicted in FIG. 1, on a rotary filter wheel 6. An alternative option is to arrange these filters on a movable slide.

LU2: Lighting Unit with Beam Focusing

This directed lighting unit consists of a light source and a condenser. It corresponds to an illumination source as depicted in FIG. 1 but without color-selective filters.

LU3: Lighting Unit with Optical Waveguide

Instead of two or more light sources for illumination, it is possible using two or more optical waveguides which start from only one light source to illuminate the security element from two or more angles. The security element is illuminated with the optical waveguides and with imaging optics which point toward the security marking.

LU4: Lighting Unit with Directed Light Source

Light sources where without further optical auxiliary components the light is emitted with an aperture of <10°, examples being lasers.

LU5: Lighting Unit for Areal Illumination

The illuminated area should be chosen so that the representative properties are characterized correctly when the security marking is tested. For example, in the case of mixtures of different pigments, a representative number of individuals should in each case lie within the illuminated spot. In the case of structured security elements, the entire element, or at least a characteristic part of the element, should lie within the illuminated spot. An areal illuminator can be constructed, for example, such that a directed lighting unit undergoes beam expansion by means of a single-lens or multilens imaging system.

LU6: Diffuse Lighting Unit (e.g. Ulbricht Cone)

Instead of illumination at selected angles a1, a2, etc., diffuse illumination at all solid angles is carried out. This is done, for example, by using an Ulbricht cone. As illumination for the Ulbricht cone a light source is used which covers a spectral range larger than the spectral range reflected by the security marking under all angles of illumination between 0° and 90°. Examples of broadband light sources for the UV range are deuterium lamps, high-pressure mercury lamps or xenon lamps. Examples of broadband light sources for the IR range are tungsten halogen lamps, high-pressure mercury lamps or xenon lamps.

Instead of light selected spectrally by means of filters it is also possible to use light sources whose light emission is limited to narrow ranges of the spectrum and whose wavelength corresponds to the center wavelength of the reflection band of the liquid-crystalline material with chiral phase. Examples of such monochromatic and wave-selected light sources are laser light or metal vapor lamps.

The selection of the detection units D (D1, D2, D3) is set out below:

A detection unit consists of one or more receivers preceded optionally by color- and/or polarization-selective elements. The selection and number of the filters depends on the test setup used and on the security marking to be tested and is described in detail in connection with the account of the test setups.

The receiver should preferably only detect the light intensity and not react selectively to color or polarization. For example, in the UV and visible spectral regions it is possible to employ a photo multiplier or a silicon photodiode and for the IR region a PbS (lead sulfide) element.

Detection units suitable for the test setup of the invention are described by way of example below.

DU1: Detector 10 with Polarization Selection and Wavelength-Selective Filter with Two Receivers FIG. 2 shows by way of example a detection system in which there is both color selection and polarization selection. The light reflected by the security marking 5 is selected by different color filters 4 brought into the beam path by means, for example, as depicted, of a filter wheel 6. An alternative option is to arrange these filters on a movable slide. The color-selected light impinges subsequently on the lambda/4 delay element 11. In this element, the circular-polarized light from the security marking is converted into linear-polarized light. In the subsequent polarization-selective beam splitter prism 12, there is selection into the two mutually perpendicular polarization directions. The two polarized component beams impinge subsequently on the respective receiver 13 E1 or E2. In selecting the optical elements, account should be taken of the criteria, known to the skilled worker, for adaptation to the selected spectral range.

The lambda/4 delay element 11 is required, for example, to maintain its delaying property over the selected spectral range. Suitable examples are, in the UV region, Fresnel rhombi made of calcite, and, in the visible and IR range, wavelength-selected, oriented PC films or Fresnel rhombi made of calcite.

The polarizing beam splitter prism for spatial separation of the two linear polarization components can be, for example, a Glan-Thompson prism with air gap for the UV range, or with IR-transparent cementing for the IR range. The selection angle of this type of prism is independent of the wavelength.

DU2: Detector 20 with Polarization Selection and Wavelength-Selective Filter and One Receiver The detection setup DU1: is modified so that only one receiver 13 is used. This is depicted by way of example in FIG. 3. The light reflected by the security marking 5 is selected by various color filters 4 which are brought into the beam path by means, for example, as depicted, of a filter wheel 6. An alternative option is to arrange these filters on a movable slide. The color-selected light impinges subsequently on right-circularly 22 and left-circularly 23 polarizing elements which are brought into the beam path using, for example, as depicted, a movable slide 21.

DU3: Detector with Wavelength-Selective Filter

The light reflected by the security marking is selected by means of various color filters which are brought into the beam path by means, for example, of a filter wheel or a movable slide.

DU4: Two Detectors with Polarization Selection

Corresponds to a setup as described under DU1:but without color selection by means of filters.

DU5: Detector with Polarization Selection

Corresponds to a setup as described under DU2 but without color selection by means of filters.

DU6: Detector without Selection of Color and Polarization

The light reflected by the security marking is detected without selection, i.e. neither by color testing nor by polarization testing.

DU7: Video Camera as Detector

Instead of a receiver which is only integrally radiation-sensitive, locally resolved detection of the incident radiation is achieved by using, for example, a video camera. The system consists of a series of color filters and/or polarizers which can be brought into the beam path, a video camera, and the associated evaluation electronics. An imaging system, consisting of one or more lenses, focuses the light from the security element into the video camera.

Alternatively, the color filters and/or polarizers can also be accommodated in the beam path between light source and marking.

The selection of the selective components, such as filters and polarizers, is subject to the criteria specified in the test setups.

General criteria for the rational combination of the lighting units with the detection units are:
a) The color filters should be used either in the lighting unit or in the detection unit.
b) The polarization can be tested at all angular configurations or only at one angular configuration.

The combination of lighting unit and detection unit to form various test setups of the invention is described by way of example below:

Test Setup 1 (TS1):

FIG. 4 shows the diagrammatic configuration of the test setup 1, 30. A security marking 5 with liquid-crystalline material is irradiated either simultaneously or in succession by the lighting units B1 and B2 and the light which has been color- and polarization-selected by the security marking is detected by the detector units D1 and D2 and analyzed.

The color of the security marking 5 is tested at angular configuration a1, b1, with a1 being defined as the angle between the illuminating light beam starting from the lighting unit B1 and the normal to the security marking 5 and b1 being defined as the angle formed by the detector D1 with the normal to the security marking.

a2 defines the angle between the illuminating light beam from the light source B2 and the normal to the security marking, and b2 defines the angle formed by the detector 2 and the normal to the security marking.

The angles should preferably satisfy the following criteria:

a1=b1, where for a1: 0° to <10° a2=b2, where for a2: 10° to <90°

Observing the angular condition, although not mandatory, is preferred.

The characteristic form of the reflection band is detected by carrying out detection at at least three spectrally different points in the center and in the flanks of the reflection band.

At the center wavelength of the reflection band, i.e. at maximum signal intensity, there is preferably, in addition, examination of the polarization property of the security marking.

At angular configuration (a2, b2) there is again testing of the color, which owing to the condition a2>a1 shows a shift toward shorter wavelengths.

The text below describes different variants of the filter selection for examining the security-relevant properties for the test setup 1:

FP1-1: Simple Testing for Color and Color Flop

Figure 5:
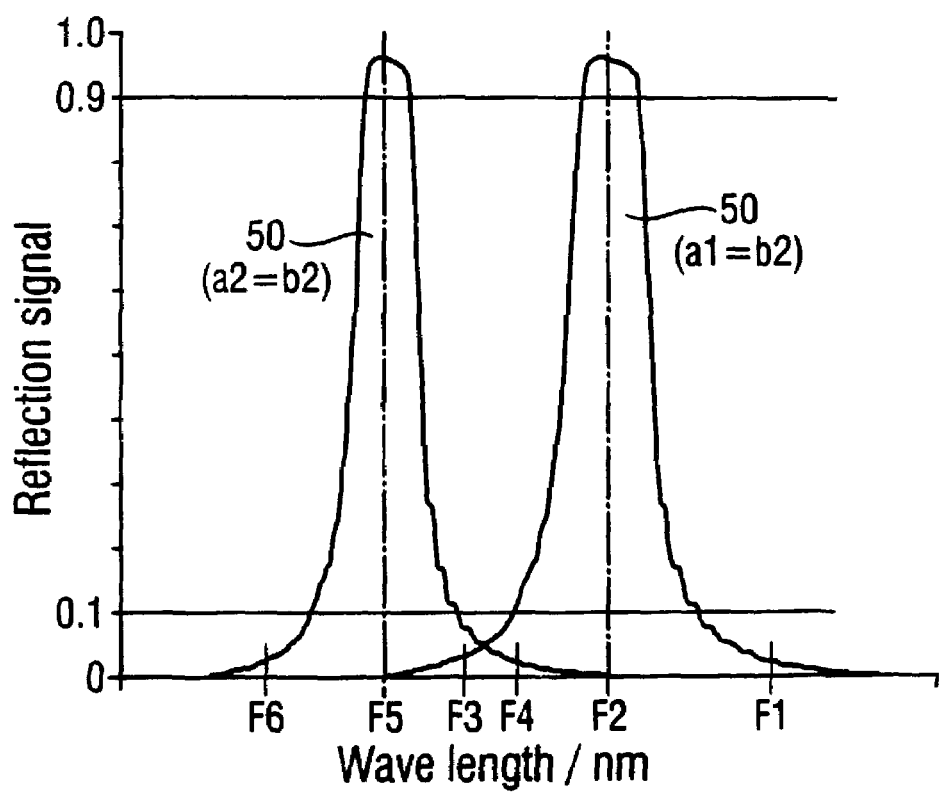
FIG. 5 shows two selected reflection bands in test setup 1 with 6 filters.

FIG. 5 shows two reflection bands 50 as typical for the claimed security markings if illumination and detection take place at two different angles a1, b1 and a2, b2. Recognizing these two bands as a characteristic feature of the claimed security markings is carried out by three narrowband filters per band. The filters used are preferably interference filters whose bandwidth is chosen, in relation to the reflection band of the security element to be detected, such that the bandwidth of the filter is between 0.5 and 5%, and is preferably 1%, of the wavelength of the middle value of the reflection band. If, for example, the center wavelength of the reflection band is 1000 nm, then preference is given to the use of a filter having a bandwidth of 10 nm.

The filters used (e.g. F1 to F6 in FIG. 5) should be chosen such that the following is true for their maximum transmission:

F1 is chosen so that the wavelength value of the maximum transmission of the filter corresponds to the wavelength value at which the intensity of the longwave band at angular position (a1, b1) has fallen to <10% of the maximum reflection in the center of the band.

F2 is chosen so that the center wavelength of the band is detected at angular position (a1, b1).

F3 is chosen so that the wavelength value of the maximum transmission of the filter corresponds to the wavelength value at which the intensity of the shortwave band at angular position (a1, b1) has fallen to <10% of the maximum reflection in the center of the band.

F4 is chosen so that the wavelength value of the maximum transmission of the filter corresponds to the wavelength value at which the intensity of the longwave band at angular position (a2, b2) has fallen to <10% of the maximum reflection in the center of the band.

F5 is chosen so that the center wavelength of the band at angular position (a2, b2) is detected in accordance with the color flop condition according to equation (I) of the liquid-crystalline species.

F6 is chosen so that the wavelength value of the maximum transmission of the filter corresponds to the wavelength value at which the intensity of the shortwave band at angular position (a2, b2) has fallen to <10% of the maximum reflection in the center of the band.

The use of six filters permits the detection of all described security features with one LC species, independently of the width of the reflection band.

FP2-1: Expanded Testing for Color and Color Flop to Increase the Level of Proof Against Forgery The use of two or more additional filters which in terms of their spectral transmittance lie between the wavelength values of F1 and F2 or of F2 and F3, respectively, permits even more precise detection of the characteristic reflection band at a1, b1.

This applies alternatively to (a2, b2), where further filters can be placed between F4 and F5 or F5 and F6, respectively. This increases further the level of proof against forgery.

Figure 6:
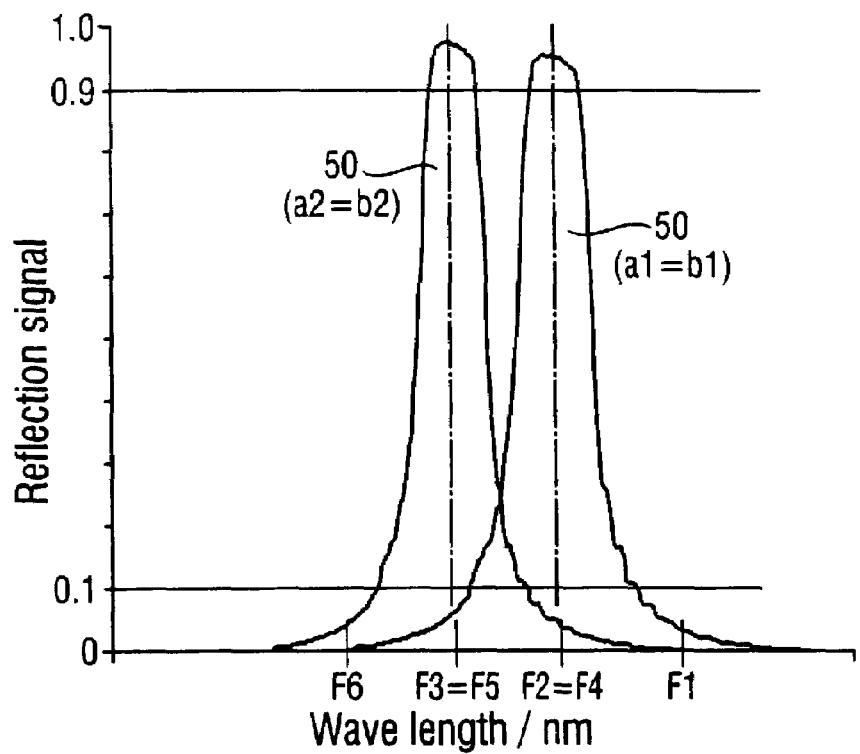
FIG. 6 shows two selected reflection bands in test setup 1 with 4 filters.

FP3-1: Testing for Color and Color Flop with a Reduced Number of Filters by Appropriate Choice of the Angular Configuration FIG. 6 shows the spectra already known from FIG. 5, with the criteria for the selection of the filters F1 t F6 being valid as described for FP1-1.

If the conditions for the two angles (a1, b1) and (a2, b2) are chosen such that at filter 2 the center wavelength of the band at angular position (a1, b1) is detected and, at the same time, at angular position (a2, b2) the decrease in the flank of the longwave band to <10% of the maximum reflection in the center of the band can be detected, and additionally such that at filter 4 the center wavelength of the band at angular position (a2, b2) is detected and, at the same time, at angular position (a1, b1) the decrease in the flank of the shortwave band to <10% of the maximum reflection in the center of the band can be detected, then only four filters are required. In accordance with the definition given in FP1-1 the following is then the case: F1, F2=F4, F3=F5, F6.

FP4-1: Expanding the Color Testing FP3-1 by Using Further Color Filters

The use of two or more additional filters which in terms of their spectral transmittance lie between the wavelength values of F1 and F2 or of F2 and F3 or of F5 and F6 respectively in the color test FP3-1 (FIG. 6) permits even more precise detection of the characteristic reflection band. This increases still further the level of proof against forgery.

FP5-1: Color Testing and Color Flop Testing with Structured Security Markings (II1-II3) and Three-Dimensionally Embedded Security Marking (VI1)

If a security marking consists of more than one LC species, then the individual LC species can be selected in the area by moving the marking or the test setup.

If there are two or more different liquid-crystalline species of unequal color within the area of illumination/detection, then a further set of filters, in accordance with the criteria described for FP1-1 and FP3-1, respectively, is required per liquid-crystalline species.

PP1-1 Testing for Polarization

The polarization of the security marking is tested in the test setup TS1 at the angular position (a1, b1) or (a2, b2). Preference is given to the angular position (a1, b1) with the filter position F2.

In order to detect simultaneously two or more different-colored LC species, the test setup TS1 can be constructed as a dual or multiple system, in which case the second and further illumination and detection groups are arranged rotated circularly about the normal to the sample surface.

In accordance with the specified criteria, the following combinations of lighting units LU1 to LU7 and detection units DU1:to DU7 are preferred in the test setup 1:

| B1 | B2 | D1 | D2 | Notes |
|----|----|----|----|-------|
| LU2 | LU2 | DU1 | DU3 | Filter selection for DU1 and DU3 in accordance with FP1-1 to FP4-1 |
| LU5 | LU5 | DU1 | DU3 | Filter selection for DU1 and DU3 in accordance with FP1-1 to FP4-1 |
|  | LU3 | DU1 | DU3 | B1 and B2 are realized by a light source LU3 with two optical waveguides |

-continued

| B1 | B2 | D1 | D2 | Notes |
|----|----|----|----|-------|
|  | LU6 | DU1 | DU3 | B1 and B2 are realized by a diffuse lighting unit LU6 |

Figure 7:
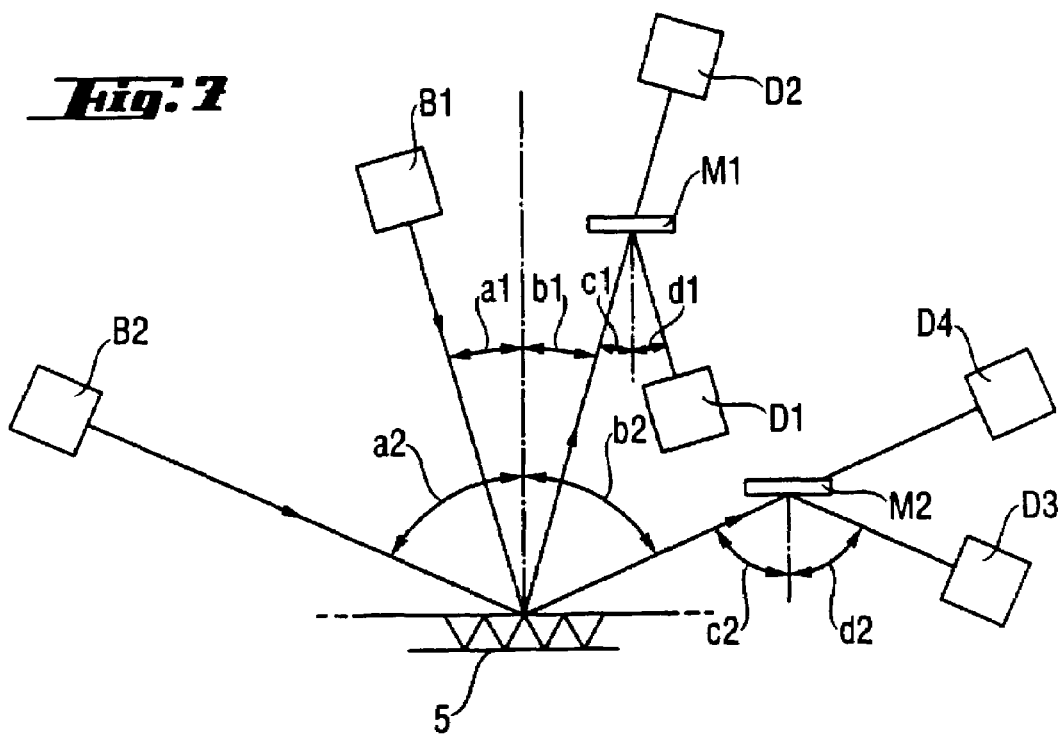
FIG. 7 shows an embodiment of test setup 2.

Test Setup 2 (TS2):

FIG. 7 shows a variant of how security markings 5 can be tested with liquid-crystalline materials. In this variant, the security marking 5 to be tested is compared directly in the detection unit with a liquid-crystalline material of the same type as the security marking 5 (master) (M1/M2). The master has the same reflection properties as the security marking to be tested but is applied to a transparent support. The security marking is illuminated simultaneously or in succession by means of the lighting units B1 and B2 at the angles a1 and a2. Examples of such lighting units are the systems described under LU2 or LU5.

The light wavelength- and polarization-selectively reflected by the security marking at the angle B1 or B2 impinges at the angles c1 and c2, respectively, on the master located within the overall setup (M1 or M2 respectively) and from there is reflected completely at the angle D1 or D2 into the detector D1 or D3, respectively. A detector of this kind is, for example, the system described under DU6.

In this test setup, the angles are required to meet the following criteria:

$a1=c1$, where for a1: 0° to <10°

$a2=c2$, where for a2: 10° to <90°

$b1=d1$, where for b1: 0° to <10°

$b2=d2$, where for b2: 10° to <90°

Observing the angular conditions, although preferred, is not mandatory.

In the case of a forged element, there occurs a false polarization component and/or light outside the reflection band. This light is transmitted by the master and arrives at detector D2 or D4. Owing to the different incidence of the light on the detectors it is possible to distinguish genuine security markings and forged security markings from one another reliably and with great sensitivity.

Figure 8:
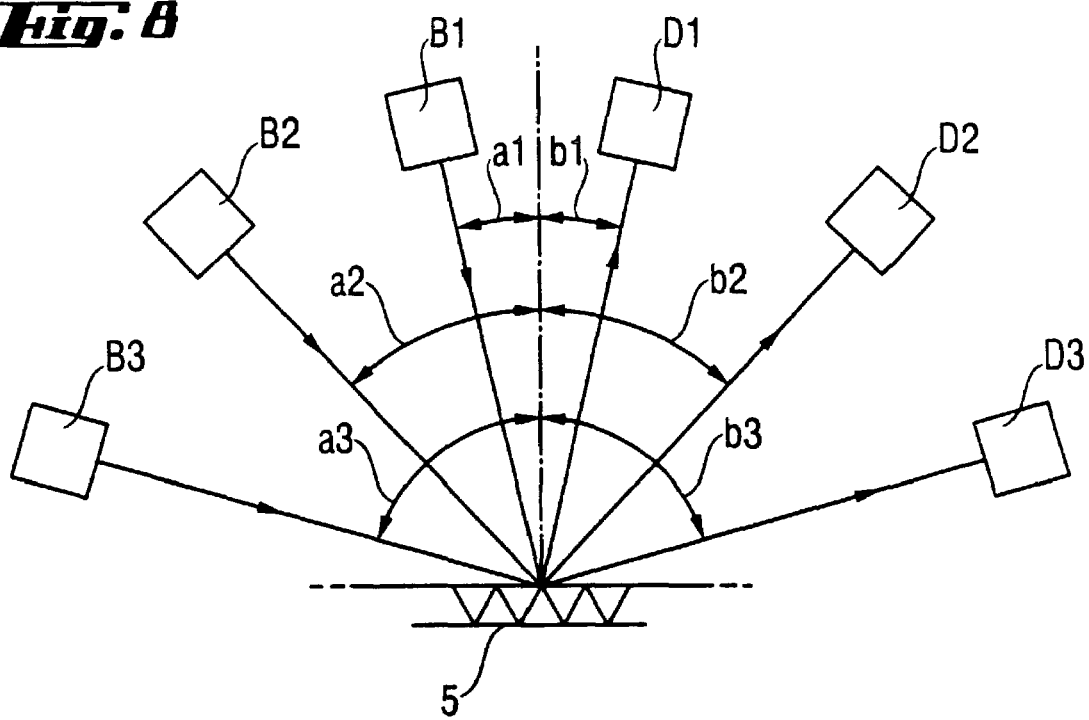
FIG. 8 shows an embodiment of test setup 3.

Test Setup 3 (TS3):

FIG. 8 shows a further variant of how security markings 5 can be tested with liquid-crystalline materials. The security marking 5 is illuminated by three lighting units (B1, B2, B3) at three angles (a1, a2, a3) and the reflected light is detected at three angles (B1, B2, B3) by the detection units (D1, D2, D3). This requires at least three filters, which given an appropriate choice of the angles of illumination can have identical specifications. A feature of this setup over the test setup TS1 is that there is no need for moving parts such as, for example, a filter wheel.

The angles in this test setup preferably meet the following criteria:

$a1=b1$, where for a1: 0° to <10°

$a2=b2$, where for a2: 10° to <90°

$a3=b3$, where for a3: 10° to <90°

$a3>a2>a1$

Observing the angular condition, although not mandatory, is preferred.

The text below describes different variants of the filter selection for examining the security-relevant properties for the test setup 3:

FP1-3: Testing for Color and Color Flop

Figure 9:
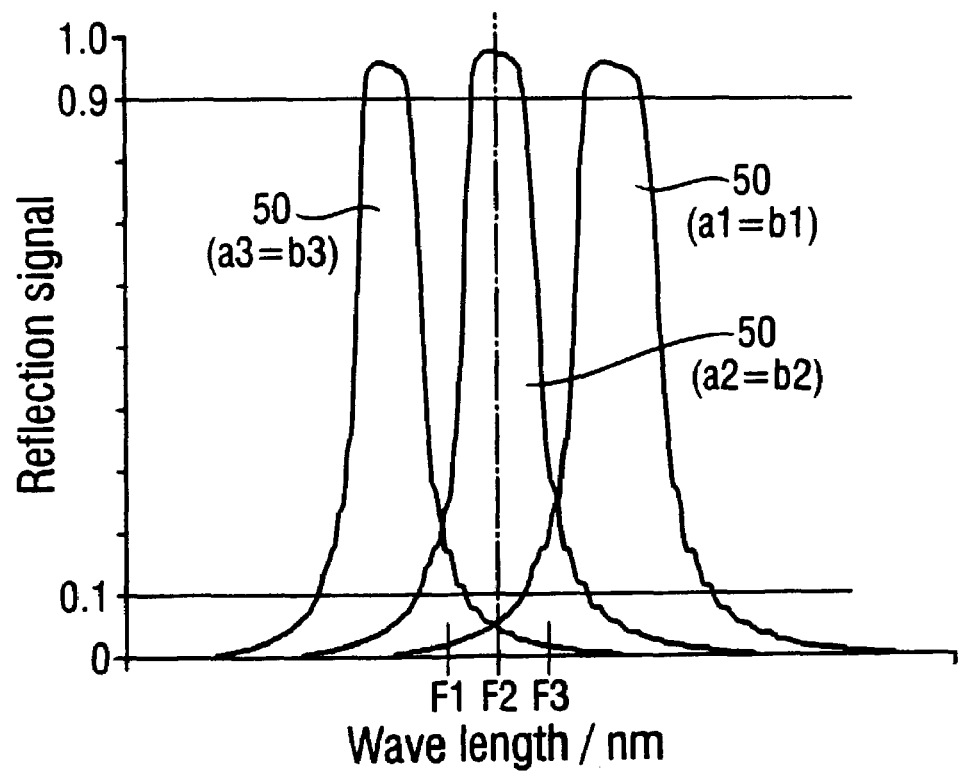
FIG. 9 shows three selected reflection bands in test setup 3 with 3 filters.

FIG. 9 shows three reflection bands 50 as are typical of the security markings of the invention if illumination/detection is carried out at three different angles a1/B1, a2/B2 and a3/b3. By detection of in each case one point per reflection band with a narrowband color filter it is possible to recognize whether a security marking having the claimed features is present. For the wavelength selection of the filters to be selected (F1 t F3 in FIG. 9) it is the case that:

F1 is chosen so that the wavelength value of the maximum transmission of the filter corresponds to the wavelength value at which the intensity of the shortwave band at angular position (a1, b1) has fallen to <10% of the maximum reflection in the center of the band.

F2 is chosen so that the center wavelength of the band is detected at angular position (a2, b2).

F3 is chosen so that the wavelength value of the maximum transmission of the filter corresponds to the wavelength value at which the intensity of the longwave band at angular position (a3, b3) has fallen to <10% of the maximum reflection in the center of the band.

Figure 10:
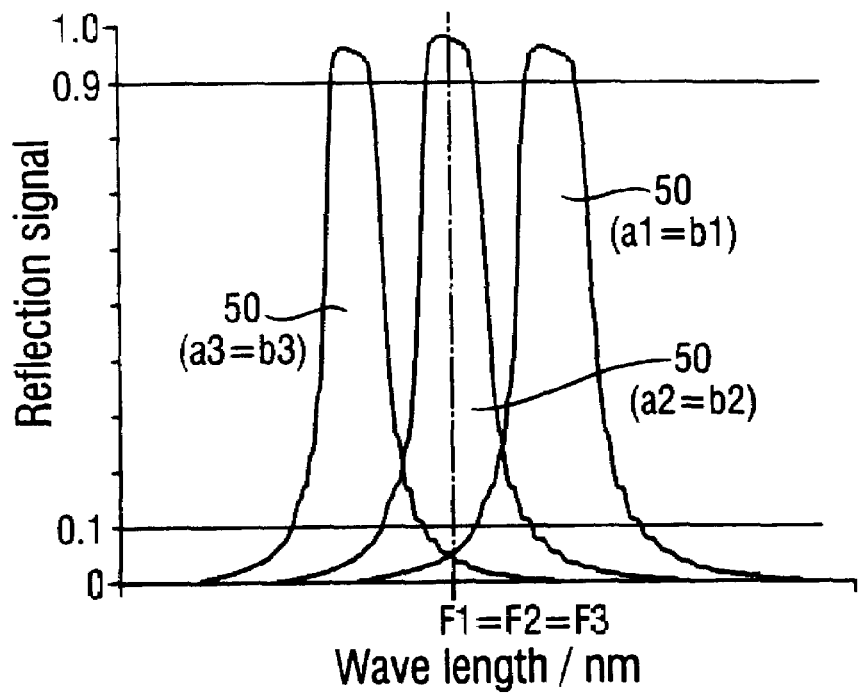
FIG. 10 shows three selected reflection bands in test setup 3 with 1 filter.

FP2-3: Testing for Color and Color Flop with One Filter Type Through an Appropriate Choice of Angular Configuration The setup corresponds to TS3, with identical filters F3=F2=F1 being used in the three beam paths:

For the selection of the filters it is the case that (FIG. 10): shortwave flank at angular position (a1, b1)=center wavelength at angular position (a2, b2)=longwave flank at angular position (a3, b3).

PP1-3: Testing for Polarization

At the angular position (a2, b2) and with the filter F2, the test for polarization is carried out together with the test for color.

The combinations of lighting and detection units specified as preferred for TS1 are likewise preferred for TS3.

Test Setup 4 (TS4):

Structured security markings (corresponding to II1-II3 in Table 1) can be recognized by imaging their entire outline or parts of the outline onto a video camera and comparing the image with an electronically stored master.

Such a setup enables even complex patterns to be recognized by machine in their entirety. Markings with complex structuring provide a sustained increase in the level of proof against forgery.

The test setup TS4 is composed of two beam paths with the angular configurations (a1, b1) and (a2, b2), as described for test setup TS1, or of three beam paths with the angular configurations (a1, b1), (a2, b2) and (a3, B3), as described for test setup TS3.

Figure 11:
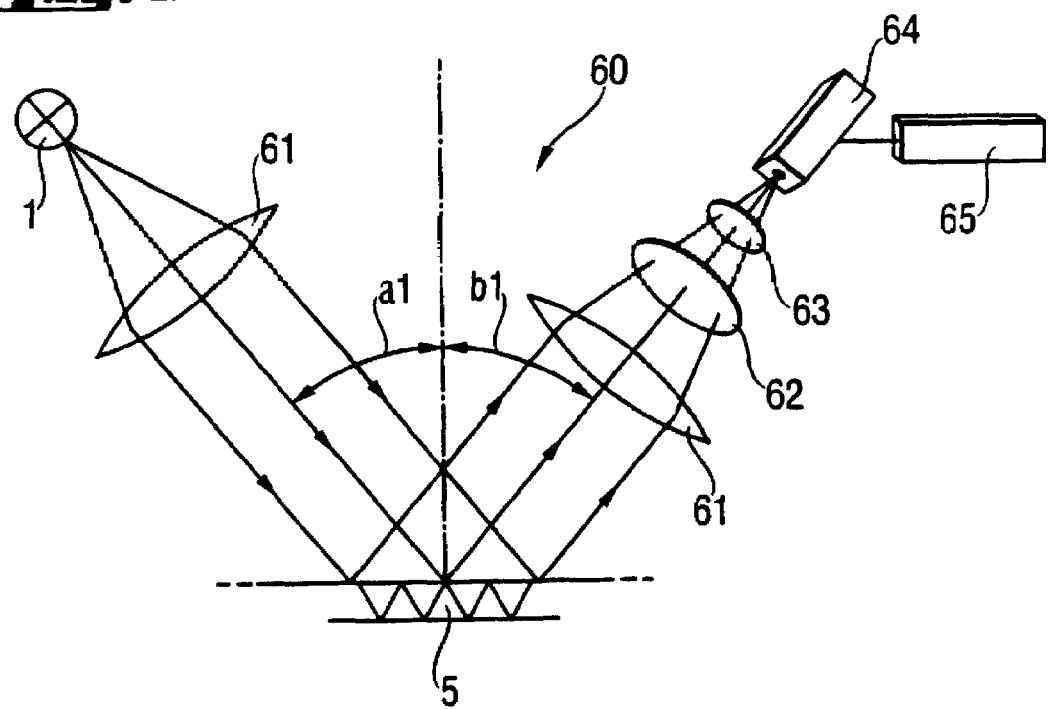
FIG. 11 shows an embodiment of test setup 4.

A test setup 60 of this kind is depicted in FIG. 11, but with only one angular configuration (a1, b1).

The illumination system consists of a light source 1 and an imaging system 61 which illuminates all of the structured security element or part of the structured security element at the angle a1 (for example, LU5).

The light reflected at the angle B1 is analyzed in the detection system. The detection system consists of an imaging system 61, consisting of one or more lenses, one or more color filters 62 and/or polarizers 63, a video camera 64, and the associated evaluation electronics 65. Alternatively, the color filters 62 and/or polarizers 63 can also be accommodated in the beam path between light source and marking 5. The component patterns, distinguished by different color and/or polarization, are digitized and compared with the corresponding electronically stored patterns. The comparison is preferably carried out such that deviations are still accepted within predetermined tolerances.

The text below describes different variants of the filter selection for examining the security-relevant properties for the test setup 4:

FP1-4: Testing for Color and Polarization

By sequential insertion of the various color filters and/or polarizers into the beam path, the component patterns of different color and/or polarization are detected in succession in the video camera.

The selection of the color filters is subject to the criteria as described in connection with the test setups TS1 and TS3.

FP2-4: Expanded Testing for Color

To increase the level of proof against forgery, examination of the color is carried out in analogy to the setup TS1 using not only one filter in the center of the reflection band 50; instead, the drop in the reflection band is examined by two further filters outside the reflection band (FIG. 5).

The selection of the color filters is subject to the criteria as described for the test setups TS1 and TS3.

FP3-4: Testing for Color Flop

To examine the color flop, the lighting system and detection system are arranged at the angular configuration (a2, b2). The color flop is examined by inserting appropriate color filters.

The selection of the color filters is subject to the criteria as described for the test setups TS1 and TS3.

Alternative Arrangement

Instead of electronic comparison of the security marking with a master, it is also possible to employ other methods of pattern recognition, examples being interferometric or holographic pattern recognition.

The test setups of the invention are not restricted to the detection of reflective security features that have been depicted by way of example. It is possible in the same way to detect security markings on transparent substrates by detection in transmission. In that case, illumination and detection are subject to the same criteria as for the reflective processes described.

Table 2 describes the preferred security systems of the invention by giving the combination of the security markings of the invention described in Table 1 with the respective, preferably suitable detection systems as described above. For each LC species of the security marking, use is to be made in the test setup of one filter set having components tailored to the LC material.

TABLE 2

| Group code for type of security marking | Appropriate test setups |
|---|---|
| I Uniform security marking of one liquid-crystalline species | |
| I1 | preferably use TS1 with IR components. Alternatively use TS2, TS3 with IR components |
| I2 | preferably use TS1 with UV components. Alternatively use TS2, TS3 with UV components |
| I3 | preferably use TS1 with IR components. Alternatively use TS2, TS3 with IR components |
| I4 | preferably use TS1 with UV components. |

TABLE 2-continued

| Group code for type of security marking | Appropriate test setups |
|---|---|
| | Alternatively use TS2, TS3 with UV components |
| II Structured security marking of at least two different liquid-crystalline species | |
| II1 | preferably use TS1 with IR and/or UV components. Alternatively use TS2, TS3, TS4 with IR and/or UV components, position detector system or security marking twice |
| II2 | preferably use TS1 with IR and/or UV components. Alternatively use TS2, TS3, TS4 with IR and/or UV components, position detector system or security marking twice |
| II3 | preferably use TS1 with IR and/or UV components. Alternatively use TS2, TS3, TS4 with IR and/or UV components, position detector system or security marking twice |
| III Unstructured security marking of at least two different liquid-crystalline species | |
| III1 | preferably use TS1 with IR and/or UV components, E1 + E2 = 1, E1/E2 = quantitative ratio of the LC species. Alternatively use TS2, TS3 with IR and/or UV components |
| III2 | preferably use TS1 with IR and/or UV components. Signal level dependent on the quantitative ratio of the LC species. Alternatively use TS2, TS3 with IR and/or UV components |
| III3 | preferably use TS1 with IR and/or UV components. Signal level dependent on the quantitative ratio of the LC species. Alternatively use TS2, TS3 with IR and/or UV components |
| IV Security marking by multicoat technique | |
| IV1 | preferably use TS1 with IR and/or UV components. Alternatively use TS2, TS3 with IR and/or UV components |
| IV2 | preferably use TS1 with IR and/or UV components. Alternatively use TS2, TS3 with IR and/or UV components |
| IV3 | preferably use TS1 with IR and/or UV components. Alternatively use TS2, TS3 with IR and/or UV components |
| V Security marking of liquid-crystalline material into which liquid-crystalline pigments are Incorporated | |
| V1 | preferably use TS1 with IR and/or UV components, E1 + E2 = 1, E1/E2 = quantitative ratio of the LC species. Alternatively use TS2, TS3 with IR and/or UV components |
| V2 | preferably use TS1 with IR and/or UV components. Signal level dependent on the quantitative ratio of the LC species. Alternatively use TS2, TS3 with IR and/or UV components |
| V3 | preferably use TS1 with IR and/or UV components. Signal level dependent on the quantitative ratio of the LC species. Alternatively use TS2, TS3 with IR and/or UV components |
| VI Three-dimensional arrangement of a uniform liquid-crystalline material in security marking | |
| VII1 | preferably TS1, alter-natively TS4, with the angular definition for a1/b1 and a2/b2 being applied in accordance with Practical Example 3.20. Use IR and/or UV components. |

The invention additionally relates to the use of the security markings of the invention as a security element on data carriers, documents of value, and identity documents.

The security markings of the invention can be combined with all known security markings, as are described, for example, in DE 3942663.

The examples which follow serve to illustrate the invention:

PRACTICAL EXAMPLE 1.1

Preparing Liquid-Crystal Material with a Left-Handed Helical Structure

In accordance with Examples 1 and 2 of EP 0 358 208

PRACTICAL EXAMPLE 1.2

Preparing Liquid-Crystal Material with a Left-Handed Helical Structure

In accordance with Example 2 of EP 0 601 483

PRACTICAL EXAMPLE 1.3

Preparing Liquid-Crystal Material with a Left-Handed Helical Structure

In accordance with Example 4 of U.S. Pat. No. 4,637,896

PRACTICAL EXAMPLE 1.4

Preparing Liquid-Crystal Material with a Right-Handed Helical Structure

In accordance with Example 1 of DE 42 34 845

PRACTICAL EXAMPLE 1.5

Preparing Liquid-Crystal Material with a Right-Handed Helical Structure

In accordance with Example 55 of WO 95/24454

PRACTICAL EXAMPLE 1.6

Coloring Liquid-Crystalline Materials Using the Liquid-Crystalline Materials Obtained in Practical Examples 1.1 to 1.5

A particular desired reflection wavelength (e.g. in accordance with Practical Example 2.1-2.4) and the handedness of the helical structure can be established, for example, by blending liquid-crystal material with a left-handed helical structure from Practical Example 1.1 or 1.2 or 1.3, or by blending liquid-crystal material with a right-handed helical structure with a right-handedly circular-polarizing component with right-handedness from Practical Example 1.4 or 1.5, or in accordance with Example 5 from DE 42 34 845 by blending liquid-crystal material with left-handedness from Practical Example 1.1 or 1.2 or 1.3 with liquid-crystal material with right-handedness from Practical Example 1.4 or 1.5.

By varying the composition of the respective blend it is possible to adjust the reflection wavelength specifically from 200 nm (UV) to 3000 nm (IR).

PRACTICAL EXAMPLE 2.1

Adjusting the Reflection Wavelength for a Liquid-Crystalline Material Which Reflects in the Infrared Spectral Range at All Angular Configurations As described in Practical Example 1.6, the reflection wavelength is adjusted so that the shortwave flank of the reflection band at an angular configuration $a1=b1=80°$ (in accordance with FIG. 4) is more than 700 nm.

PRACTICAL EXAMPLE 2.2

Adjusting the Reflection Wavelength for a Liquid-Crystalline Material Which Reflects in the Ultraviolet Spectral Range at All Angular Configurations As described in Practical Example 1.6, the reflection wavelength is adjusted so that the longwave flank of the reflection band at an angular configuration $a1=b1=0°$ (in accordance with FIG. 4) is less than 420 nm.

PRACTICAL EXAMPLE 2.3

Preparing a Liquid-Crystalline Material Which Reflects in the Infrared Spectral Range at All Angular Configurations and Whose Reflection Bands Have Been Broadened The reflection band of the liquid-crystalline materials prepared in accordance with Practical Example 1.1 to 1.5 is broadened using the methods described in EP 0 606 940 in such a way that the shortwave flank of the reflection band at an angular configuration $a1=b1=80°$ (in accordance with FIG. 4) is more than 700 nm.

PRACTICAL EXAMPLE 2.4

Preparing a Liquid-Crystalline Material Which Reflects in the Ultraviolet Spectral Range at All Angular Configurations and Whose Reflection Bands Have Been Broadened The reflection band of the liquid-crystalline materials prepared in Practical Example 1.1-1.5 is broadened using the methods described in EP 0 606 940 in such a way that the longwave flank of the reflection band at an angular configuration $a1=b1=0°$ (in accordance with FIG. 4) is less than 420 nm.

PRACTICAL EXAMPLE 2.5

Preparing Two Liquid-Crystalline Materials with the Same Color and Different Handedness of the Helical Structure The two liquid-crystalline materials are prepared such that the characteristic reflection bands of the two materials show no difference or at least are so similar that the center wavelengths of the characteristic reflection bands differ by not more than 1% of the value of the center wavelength and the bandwidths of the reflection bands deviate by less than 2%.

Material 1: rh, material 2, lh.

The center wavelengths and helical handednesses of material 1 and material 2 are adjusted as described in Practical Example 1.6 in such a way that the center wavelengths and bandwidths of material 1 and material 2 correspond to the data in one of Practical Examples 2.1 to 2.4.

PRACTICAL EXAMPLE 2.6

Preparing Two Liquid-Crystalline Materials with Different Color and the Same Handedness of the Helical Structure The two liquid-crystalline materials are prepared as described in Practical Examples 2.6a or 2.6b, the center wavelengths of the characteristic reflection bands of the two materials differing by more than 1% of the center wavelength value and/or the bandwidths of the reflection bands deviating by more than 2%.

PRACTICAL EXAMPLE 2.6a

Material 1: rh, material 2, rh. The center wavelengths and helical handednesses of material 1 and material 2 are adjusted as described in Practical Example 1.6, with the center wavelengths and bandwidths of material 1 and material 2 being adjusted as described in one of Practical Examples 2.1 to 2.4.

PRACTICAL EXAMPLE 2.6b

Material 1: lh, material 2, lh. The center wavelengths and helical handednesses of material 1 and material 2 are adjusted as described in Practical Example 1.6, with the center wavelengths and bandwidths of material 1 and material 2 being adjusted as described in one of Practical Examples 2.1 to 2.4.

PRACTICAL EXAMPLE 2.7

Preparing Two Liquid-Crystalline Materials of Different Color and Different Handedness of the Helical Structure The two liquid-crystalline materials are prepared such that the characteristic reflection bands of the two materials differ and the helical handednesses are opposite.

The two characteristic reflection bands differ when the center wavelengths deviate by more than 1% of the center wavelength value and/or the bandwidths of the reflection bands deviate from one another by more than 2%.

Material 1: rh, material 2: lh. The center wavelengths and helical handednesses of material 1 and material 2 are adjusted as described in Practical Example 1.6, the center wavelengths and bandwidths of material 1 and material 2 being adjusted as described in one of Practical Examples 2.1 to 2.4.

PRACTICAL EXAMPLE 3.1

Preparing a Liquid-Crystalline Coat on a Support Film

The liquid-crystalline material adjusted in accordance with one of Practical Examples 2.1-2.4 is applied by a method described in EP 358 208 to a tear-resistant plastic, for example, a polyester film, and then orientation and crosslinking are carried out. In this case it is possible to employ all of the variants described in DE 39 42 663 (e.g. black or colored background, texturing of background). The support webs thus obtained with the liquid-crystalline materials can, for example, be cut as described in DE 39 42 663 into narrow webs or filaments and can be embedded as security filaments into paper or other materials. All of the other methods described in DE 39 42 663, such as for the preparation of transfer elements, are likewise possible (DE 39 42 663 is incorporated by reference).

PRACTICAL EXAMPLE 3.2

Producing a Structured Marking From Two Liquid-Crystalline Materials if the Same Color but Different Handedness of the Helical Structure in Whole-Area Coating As in Practical Example 3.1, one carrier material in each case, such as a polyester film, is coated with two different liquid-crystalline materials prepared in accordance with Practical Example 2.5. Using known techniques such as stamping, for example, the two films thus obtained are used to produce patterns which are used in turn to produce a security element consisting of two liquid-crystalline materials of the same color but different helical handedness. This is performed, for example, in accordance with the processes described in DE 39 42 663 for producing/processing security elements in data carriers.

PRACTICAL EXAMPLE 3.3

Producing a Structured Marking From Two Liquid-Crystalline Materials of the Same Color but Different Handedness of the Helical Structure in Whole-Area Coating Two different liquid-crystalline materials prepared as described in Practical Example 2.5 are coated simultaneously onto a support material, for example, a polyester film, by the process described in EP 358 208 using a chamber-type coating bar with two separate chambers directly adjacent to one another, and then orientation and crosslinking are carried out. This produces a film strip having two different liquid-crystal areas lying directly adjacent to one another. The further processing of a film strip produced in this way is analogous to the processes described in DE 39 42 663.

PRACTICAL EXAMPLE 3.4

Producing a Structured Marking From Two Liquid-Crystalline Materials of Different Color but the Same Handedness of the Jelical Structure in Whole-Area Coating The procedure of Practical Example 3.2 is repeated with the difference that the liquid-crystalline materials used are prepared as described in Practical Example 2.6 rather than as described in Practical Example 2.5.

PRACTICAL EXAMPLE 3.5

Producing a Structured Marking From Two Different-Colored Liquid-Crystalline Materials of the Same Handedness of the Helical Structure in Whole-Area Coating The procedure of Practical Example 3.3 is repeated with the difference that the liquid-crystalline materials used are prepared as described in Practical Example 2.6 rather than as described in Practical Example 2.5.

PRACTICAL EXAMPLE 3.6

Producing a Structured Marking From Two Liquid-Crystalline Materials of Different Color and Different Helical Handedness in Whole-Area Coating The procedure of Practical Example 3.2 is repeated with the difference that the liquid-crystalline materials used are prepared as described in Practical Example 2.7 rather than as described in Practical Example 2.5.

PRACTICAL EXAMPLE 3.7

Producing a Structured Marking From Two Different-Colored Liquid-Crystalline Materials of Different Handedness of The Helical Structure in Whole-Area Coating The procedure of Practical Example 3.3 is repeated with the difference that the liquid-crystalline materials used are prepared as described in Practical Example 2.7 rather than as described in Practical Example 2.5.

PRACTICAL EXAMPLE 3.8

Producing a Security Marking Consisting of Two Different Liquid-Crystalline Materials Applied Atop One Another in Whole-Area Coating Two different liquid-crystalline materials prepared as described in Practical Example 2.5, 2.6 or 2.7 are each applied independently by the method described in EP 358208 to a tear-resistant plastic, for example, a polyester film, and orientation and crosslinking are carried out. The resulting support webs are then laminated by a process known per se, with the aid for example of a hotmelt adhesive layer applied to the liquid-crystalline coat. This is described, for example, in DE 39 42 663. The support webs thus obtained can be used in the process described in DE 39 42 663 (for example, for producing security filaments).

PRACTICAL EXAMPLE 3.9

Producing a Security Marking Consisting of two Different Liquid-Crystalline Materials Applied Atop One Another in Whole-Area Coating Two different liquid-crystalline materials prepared as described in Practical Example 2.5, 2.6 or 2.7 are applied atop one another in succession by the method described in JP 08 146 416 A2 to a tear-resistant plastic, for example, a polyester film. The support webs thus obtained are processed further as described in Practical Example 3.8 to form a security element.

PRACTICAL EXAMPLE 3.10

Producing a Security Marking Consisting of Two Liquid-Crystalline Materials with the Same Color and Different Handedness of the Helical Structure Which are Applied Atop One Another The procedure of Practical Example 3.8 is repeated using the liquid-crystalline materials prepared as described in Practical Example 2.5.

PRACTICAL EXAMPLE 3.11

Producing a Security Marking Consisting of 2 Liquid-Crystalline Materials with the Same Color and Different Handedness of the Helical Structure (Alternative to Practical Example 3.10) Which are Applied Atop One Another The procedure of Practical Example 3.9 is repeated using the liquid-crystalline materials prepared as described in Practical Example 2.5.

PRACTICAL EXAMPLE 3.12

Producing a Security Marking Consisting of Two Liquid-Crystalline Materials with Different Colors and the Same Handedness of the Helical Structure Which are Applied Atop One Another The procedure of Practical Example 3.8 is repeated using the liquid-crystalline materials prepared as described in Practical Example 2.6.

PRACTICAL EXAMPLE 3.13

Producing a Security Marking Consisting of Two Liquid-Crystalline Materials with Different Color and the Same Handedness of the Helical Structure (Alternative to Practical Example 3.12) Which are Applied Atop One Another The procedure of Practical Example 3.9 is repeated using the liquid-crystalline materials prepared as described in Practical Example 2.6.

PRACTICAL EXAMPLE 3.14

Producing a Security Marking Consisting of Two Liquid-Crystalline Materials with Different Color and Different Handedness of the Helical Structure Which are Applied Atop One Another The procedure of Practical Example 3.8 is repeated using the liquid-crystalline materials prepared as described in Practical Example 2.7.

PRACTICAL EXAMPLE 3.15

Producing a Security Marking Consisting of Two Liquid-Crystalline Materials with Different Color and Different Handedness of the Helical Structure Which are Applied Atop One Another The procedure of Practical Example 3.9 is repeated using the liquid-crystalline materials prepared as described in Practical Example 2.7.

PRACTICAL EXAMPLE 3.16

Producing a Security Marking of Liquid-Crystalline Pigments with Chiral Phase Which are Incorporated into a Different Liquid-Crystalline Material Two different liquid-crystalline materials prepared as in Practical Example 2.5, 2.6 or 2.7 are processed further as follows: the first material (material 1) is processed to pigments as described in EP 0 601 483, Example 1B and then incorporated into the second material (material 2) which, finally, is applied to a tear-resistant plastic, for example, a polyester film, and then orientation and crosslinking are carried out. The proportion of the first material (in pigment form) to the second must be chosen such that the second material can be oriented sufficiently under conditions in accordance with the prior art. Further processing of the coated support web to a security element takes place in analogy to the methods as described in DE 39 42 663.

PRACTICAL EXAMPLE 3.17

Producing a Security Marking of Liquid-Crystalline Pigments with Chiral Phase Which are Incorporated into a Different Liquid-Crystalline Material, the Two Liquid-Crystalline Materials Being of the Same Color and Having Different Handedness of the Helical Structure The procedure of Practical Example 3.16 is repeated using the liquid-crystalline materials prepared as described in Practical Example 2.5.

PRACTICAL EXAMPLE 3.18

Producing a Security Marking of Liquid-Crystalline Pigments with Chiral Phase Which are Incorporated into a Different Liquid-Crystalline Material, the Two Liquid-Crystalline Materials Being of Different Colors and the Same Handedness of the Helical Structure The procedure of Practical Example 3.17 is repeated using the liquid-crystalline materials prepared as described in Practical Example 2.6.

PRACTICAL EXAMPLE 3.19

Producing a Security Marking of Liquid-Crystalline Pigments with Chiral Phase Which are Incorporated into a Different Liquid-Crystalline Material, the Two Liquid-Crystalline Materials Being of Different Colors and Different Handednesses of the Helical Structure The procedure of Practical Example 3.18 is repeated using the liquid-crystalline materials prepared as described in Practical Example 2.7.

PRACTICAL EXAMPLE 3.20

Figure 12:
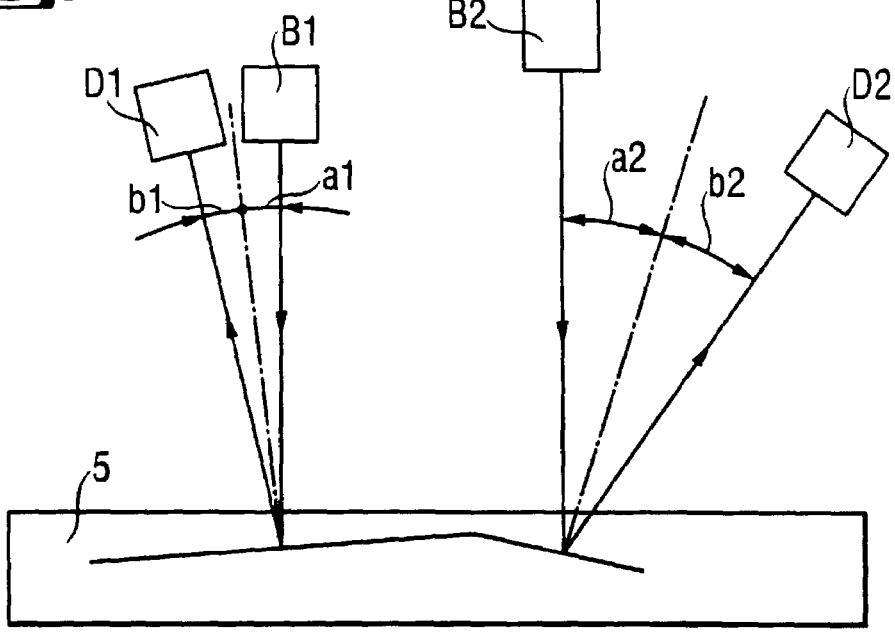
FIG. 12 shows a three-dimensional embodiment of test setup 1.

Producing a Security Marking Consisting of a Three-Dimensional Arrangement of a Liquid-Crystalline Material in a Matrix This practical example utilizes the pronounced color flop behavior of liquid-crystalline systems with chiral phase under different illumination/detection configurations by fixing the liquid-crystalline system at different angles in a matrix at various points of a security marking 5, as is shown, for example, in FIG. 12. For this purpose, the liquid-crystalline material used, prepared in accordance with Practical Example 2.1, 2.2, 2.3 or 2.4, is first of all applied to a film, for example, a polyester film, and then orientation and crosslinking are carried out. A polymer matrix of PVC, for example, is converted into a sawtoothlike form by means, for example, of shaping presses. The support web, consisting of polyester film with applied liquid-crystalline material, is then applied to the sawtooth structure by lamination, for example, by means of hot melt adhesive technology, and finally is covered evenly with a further polymer matrix. This produces planar security markings which can, for example, be incorporated into a card.

A security marking produced in this way is detected as follows: as shown in FIG. 12, an illumination/detection system as described, for example, in Practical Example 4.1, produces the following signal at two different points of the security marking:

At position 1 with B1 and D1, a reflection band having a center wavelength obtained in accordance with equation (I), with the positioning of B1 and D1 determining the angles a1 and B1 (a1=b1), while at position 2 with B2 and D2 a reflection band is obtained which has a center wavelength corresponding to the angular condition (a2=b2). It should be noted that the detection area must be smaller than the area of the positions 1 and 2 to be measured.

The above-described Practical Examples 3.1-3.20 deal with liquid-crystalline materials in full-area application. It is, however, also possible to obtain whole-area effects in accordance with the mosaic principle described in EP 0 685 749, with the aid of pigments of liquid-crystalline materials with chiral phase. The security markings described in the Practical Examples 3.1-3.20 can accordingly also be produced from pigments, as described in the following practical examples:

PRACTICAL EXAMPLE 3.21

Preparing a Liquid-Crystalline Coat on a Support Film by Screen Printing From Pigments Incorporated into a Binder Which Comprise Liquid-Crystalline Material with Chiral Phase The liquid-crystalline material from Practical Examples 1.1-1.5, for which as described in Practical Example 2.5 the reflection wavelengths have been adjusted to the values specified in Practical Examples 2.1-2.4, is processed to pigments by the process described in EP 0 601 483, Example 1B. Following their incorporation into an appropriate binder system, the resulting pigments are applied by means of the screen printing technique, which is known per se, to a tear-resistant plastic, for example a polyester film. The further processing of these films takes place in accordance, for example, with the methods described in DE 39 42 663 it also being possible to employ the variants described therein for producing security markings.

PRACTICAL EXAMPLE 3.22

Preparing a Liquid-Crystalline Coat of Pigments of Liquid-Crystalline Material with Chiral Phase Which are Incorporated into a Polymer Matrix The liquid-crystalline material adjusted in Practical Examples 1.1-1.4 in accordance with Practical Example 2.5 to the wavelength according to Practical Examples 2.1-2.4 is incorporated by the method described in EP 0 601 483 into a PVC. Further processing of the resulting films is as described in Practical Example 3.21.

PRACTICAL EXAMPLE 3.23

Producing a Structured Marking From two Pigments of the Same Color and Different Handedness of the Helical Structure Films with liquid-crystalline material are produced in accordance with Practical Example 3.21 using two different liquid-crystalline materials prepared as described in Practical Example 2.5, the processing of the support films to structured markings taking place as described in Practical Example 3.2.

PRACTICAL EXAMPLE 3.24

Producing a Structured Marking From two Pigments of the Same Color and of Liquid-Crystalline Materials with Different Handedness of the Helical Structure The support films are prepared in accordance with Practical Example 3.22 using two different liquid-crystalline materials prepared as described in Practical Example 2.5, the processing of the support films to structured markings taking place as described in Practical Example 3.2.

PRACTICAL EXAMPLE 3.25

Producing a Structured Marking From Two Different-Colored Pigments of Liquid-Crystalline Materials with the Same Handedness of the Helical Structure The support films are prepared in accordance with Practical Example 3.21 using two different liquid-crystalline materials prepared as described in Practical Example 2.6, the processing of the support films to structured markings taking place as described in Practical Example 3.2.

PRACTICAL EXAMPLE 3.26

Variant of Practical Example 3.25: Producing a Structured Marking From Two Different-Colored Pigments of Liquid-Crystalline Materials with the Same Handedness of the Helical Structure The support films are prepared in accordance with Practical Example 3.22 using two different liquid-crystalline materials prepared as described in Practical Example 2.6, the processing of the support films to structured markings taking place as described in Practical Example 3.2.

PRACTICAL EXAMPLE 3.27

Producing a Structured Marking From Two Different-Colored Pigments of Liquid-Crystalline Materials with Different Handedness of the Helical Structure The support films are prepared in accordance with Practical Example 3.21 using two different liquid-crystalline materials prepared as described in Practical Example 2.7, the processing of the support films to structured markings taking place as described in Practical Example 3.2.

PRACTICAL EXAMPLE 3.28

Producing a Structured Marking From Two Different-Colored Pigments of Liquid-Crystalline Materials with Different Handedness of the Helical Structure The support films are prepared in accordance with Practical Example 3.22 using two different liquid-crystalline materials prepared as described in Practical Example 2.7, the processing of the support films to structured markings taking place as described in Practical Example 3.2.

PRACTICAL EXAMPLE 3.29

Producing an Unstructured Marking Consisting of a Mixture of Pigments of the Same Color and of Liquid-Crystalline Materials with Different Handedness of the Helical Structure The two liquid-crystalline materials adapted to one another in terms of color as described in Practical Example 2.5 are each processed independently into pigments by the processes described in EP 0 601 483, Example 1B. The resulting pigments are then processed further as follows in a mixing ratio A:B (% by weight):

PRACTICAL EXAMPLE 3.29a

A:B=1:1, processing as in Practical Example 3.21 (screen printing process)

PRACTICAL EXAMPLE 3.29b

A:B=2:1, processing as in Practical Example 3.21 (screen printing process)

PRACTICAL EXAMPLE 3.29c

A:B=1:2, processing as in Practical Example 3.21 (screen printing process)

Using, for example, the detection arrangement described in Practical Example 4.1, the proportions A:B can be determined from the relative intensities of the reflection bands.

PRACTICAL EXAMPLE 3.30

Producing an Unstructured Marking Consisting of a Mixture of Pigments of the Same Color and of Liquid-Crystalline Materials with Different Handedness of the Helical Structure The procedure described in Practical Example 3.29 is repeated with the difference that the pigments are processed not as described in Practical Example 3.21 (screen printing process) but instead as described in Practical Example 3.22 (incorporation into film).

PRACTICAL EXAMPLE 3.31

Producing an Unstructured Marking Consisting of a Mixture of Different-Colored Pigments of Liquid-Crystalline Materials with the Same Handedness of the Helical Structure The procedure described in Practical Example 3.29 is repeated with the difference that the liquid-crystalline material used is not that prepared as described in Practical Example 2.5 but that prepared as described in Practical Example 2.6.

PRACTICAL EXAMPLE 3.32

Producing an Unstructured Marking Consisting of a Mixture of Different-Colored Pigments if Liquid-Crystalline Materials with the Same Handedness of the Helical Structure The procedure described in Practical Example 3.30 is repeated with the difference that the liquid-crystalline material used is not that prepared as described in Practical Example 2.5 but that prepared as described in Practical Example 2.6.

PRACTICAL EXAMPLE 3.33

Producing an Unstructured Marking Consisting of a Mixture of Different-Colored Pigments of Liquid-Crystalline Materials with Different Handedness of the Helical Structure The procedure described in Practical Example 3.29 is repeated with the difference that the liquid-crystalline material used is not that prepared as described in Practical Example 2.5 but that prepared as described in Practical Example 2.7.

PRACTICAL EXAMPLE 3.34

Producing an Unstructured Marking Consisting of a Mixture of Different-Colored Pigments of Liquid-Crystalline Materials with Different Handedness of the Helical Structure The procedure described in Practical Example 3.30 is repeated with the difference that the liquid-crystalline material used is not that prepared as described in Practical Example 2.5 but that prepared as described in Practical Example 2.7.

PRACTICAL EXAMPLE 3.35

Producing a Security Marking Consisting of Two Different Pigments of Liquid-Crystalline Materials, Applied by the Screen Printing Process Two different liquid-crystalline materials prepared as described in Practical Examples 2.5, 2.6 or 2.7 are used to prepare pigments by the process described in EP 0 601 483, Example 1B. By means of a screen printing process using a screen printing binder, the pigments are each applied independently to a tear-resistant plastic, for example a polyester film. Further processing of the two support webs thus obtained is as described in Practical Example 3.8.

PRACTICAL EXAMPLE 3.36

Variant of Practical Example 3.35: Producing a Security Marking Consisting of Two Different Pigments of Liquid-Crystalline Materials, Incorporated into a Polymer Matrix The procedure of Practical Example 3.35 is repeated with the difference that, instead of the screen printing process, the pigments are each incorporated independently as described in Practical Example 3.22 into a polymer matrix.

PRACTICAL EXAMPLE 3.37

Preparing Pigments From Two Different Liquid-Crystalline Materials Which Have Been Coated Atop One Another The pigments are prepared as in EP 0 601 483, Example 1C, using as basis a liquid-crystalline double coat applied as described in Practical Example 3.9 to a support film. The liquid-crystalline materials used in this case were prepared as described in Practical Examples 2.5, 2.6 or 2.7.

PRACTICAL EXAMPLE 3.38

Producing a Security Marking Consisting of Pigments Which Consist of Two Liquid-Crystalline Coats Coated Atop One Another and Which are Applied by the Screen Printing Process The pigments prepared in Practical Example 3.37 are processed in the screen printing process in analogy to the process described in Practical Example 3.21. The support web thus obtained is processed further as described in Practical Example 3.21 to give markings.

PRACTICAL EXAMPLE 3.39

Variant of Practical Example 3.38: Producing a Security Marking Consisting of Pigments Which Consist of Two Liquid-Crystalline Coats Coated Atop One Another and Which are Incorporated into a Polymer Matrix The pigments prepared in Practical Example 3.37 are incorporated by the process described in Practical Example 3.22 into a polymer matrix and are processed further as described therein to give markings.

PRACTICAL EXAMPLE 3.40

Producing a Security Marking Consisting of Two Different Pigments, Applied by the Screen Printing Process, of Liquid-Crystalline Materials with the Same Color and Different Handedness of the Helical Structure The procedure described in Practical Example 3.35 is repeated using the liquid-crystalline material prepared as described in Practical Example 2.5.

PRACTICAL EXAMPLE 3.41

Variant of Practical Example 3.40: Producing a Security Marking Consisting of Two Different Pigments, Incorporated into a Polymer Matrix, of Liquid-Crystalline Materials with the Same Color and Different Handedness of the Helical Structure The procedure described in Practical Example 3.36 is repeated using the liquid-crystalline material prepared as described in Practical Example 2.5.

PRACTICAL EXAMPLE 3.42

Producing a Security Marking Consisting of Pigments Which Consist of Two Liquid-Crystalline Coats of the Same Color and Different Handedness of the Helical Structure, Coated Atop One Another, and Which are Applied by the Screen Printing Process The procedure described in Practical Example 3.38 is repeated using the liquid-crystalline material prepared as described in Practical Example 2.5.

PRACTICAL EXAMPLE 3.43

Variant of Practical Example 3.42: Producing a Security Marking Consisting of Pigments Which Consist of Two Liquid-Crystalline Coats of the Same Color and Different Handedness of the Helical Structure, Coated Atop One Another, and Which are Incorporated into a Polymer Matrix The procedure described in Practical Example 3.39 is repeated using the liquid-crystalline material prepared as described in Practical Example 2.5.

PRACTICAL EXAMPLE 3.44

Producing a Security Marking Consisting of Two Pigments, Applied by Screen Printing Processes, of Different Color and the Same Handedness of the Helical Structure The procedure described in Practical Example 3.35 is repeated using the liquid-crystalline material prepared as described in Practical Example 2.6.

PRACTICAL EXAMPLE 3.45

Variant of Practical Example 3.40: Producing a Security Marking Consisting of Two Different Pigments of Liquid-Crystalline Materials of Different Color and the Same Handedness of the Helical Structure, and Which are Incorporated into a Polymer Matrix The procedure described in Practical Example 3.36 is repeated using the liquid-crystalline material prepared as described in Practical Example 2.6.

PRACTICAL EXAMPLE 3.46

Producing a Security Marking Consisting of Pigments Which Consist of Two Liquid-Crystalline Coats of Different Color and the Same Handedness of the Helical Structure, Coated Atop One Another, and Which are Applied by the Screen Printing Process The procedure described in Practical Example 3.38 is repeated using the liquid-crystalline material prepared as described in Practical Example 2.6.

PRACTICAL EXAMPLE 3.47

Variant of Practical Example 3.42: Producing a Security Marking Consisting of Pigments Which Consist of Two Liquid-Crystalline Coats of Different Color and the Same Handedness of the Helical Structure, Coated Atop One Another, and Which are Incorporated into a Polymer Matrix The procedure described in Practical Example 3.39 is repeated using the liquid-crystalline material prepared as described in Practical Example 2.6.

PRACTICAL EXAMPLE 3.48

Producing a Security Marking, Consisting of Two Different Pigments, From Liquid-Crystalline Materials Applied by the Screen Printing Process, of Different Color and Different Handedness of the Helical Structure The procedure described in Practical Example 3.35 is repeated using the liquid-crystalline material prepared as described in Practical Example 2.7.

PRACTICAL EXAMPLE 3.49

Variant of Practical Example 3.40: Producing a Security Marking Consisting of 2 Different Pigments of Liquid-Crystalline Materials of Different Color and Different Handedness of the Helical Structure, and Which are Incorporated into a Polymer Matrix The procedure described in Practical Example 3.36 is repeated using the liquid-crystalline material prepared as described in Practical Example 2.7.

PRACTICAL EXAMPLE 3.50

Producing a Security Marking Consisting of Pigments Which Consist of Two Liquid-Crystalline Coats of Different Color and Different Handedness of the Helical Structure, Coated Atop One Another, and Which are Applied by the Screen Printing Process The procedure described in Practical Example 3.38 is repeated using the liquid-crystalline material prepared as described in Practical Example 2.7.

PRACTICAL EXAMPLE 3.51

Producing a Security Marking Consisting of Pigments Which Consist of Two Liquid-Crystalline Coats of Different Color and Different Handedness of the Helical Structure, Coated Atop One Another, and Which are Incorporated into a Polymer Matrix The procedure described in Practical Example 3.39 is repeated using the liquid-crystalline material prepared as described in Practical Example 2.7.

PRACTICAL EXAMPLE 3.52

Producing a Security Marking From Pigments of Liquid-Crystalline Material into Which Pigments of Liquid-Crystalline Material Have Been Incorporated, the Liquid-Crystalline Materials Used Having the Same Color and Different Handedness of the Helical Structure Using liquid-crystalline materials prepared in accordance with Practical Example 2.5, coated support webs are prepared as described in Practical Example 3.16 and are processed further to give pigments as in EP 0 601 483, Example 1B. The pigments thus prepared are processed further in the screen printing process in accordance with Practical Example 3.21.

PRACTICAL EXAMPLE 3.53

Producing a Security Marking From Pigments of Liquid-Crystalline Material into Which Pigments of Liquid-Crystalline Material Have Been Incorporated, the Liquid-Crystalline Materials Used Having the Same Color and Different Handedness of the Helical Structure Using liquid-crystalline materials prepared in accordance with Practical Example 2.5, coated support webs are prepared as described in Practical Example 3.16 and are processed further to give pigments as in EP 0 601 483, Example 1B. The pigments thus prepared are processed further into a polymer matrix in accordance with Practical Example 3.22.

PRACTICAL EXAMPLE 3.54

Producing a Security Marking From Pigments of Liquid-Crystalline Material into Which Pigments of Liquid-Crystalline Material Have Been Incorporated, the Liquid-Crystalline Materials Used Having Different Color and the Same Handedness of the Helical Structure Using liquid-crystalline materials prepared in accordance with Practical Example 2.6, coated support webs are prepared as described in Practical Example 3.16 and are processed further to give pigments as in EP 0 601 483, Example 1B. The pigments thus prepared are processed further in the screen printing process in accordance with Practical Example 3.21.

PRACTICAL EXAMPLE 3.55

Producing a Security Marking From Pigments of Liquid-Crystalline Material into Which Pigments of Liquid-Crystalline Material Have Been Incorporated, the Liquid-Crystalline Materials Used Having Different Color and the Same Handedness of the Helical Structure Using liquid-crystalline materials prepared in accordance with Practical Example 2.6, coated support webs are prepared as described in Practical Example 3.16 and are processed further to give pigments as in EP 0 601 483, Example 1B. The pigments thus prepared are processed further into a polymer matrix in accordance with Practical Example 3.22.

PRACTICAL EXAMPLE 3.56

Producing a Security Marking From Pigments of Liquid-Crystalline Material into Which Pigments of Liquid-Crystalline Material Have Been Incorporated, the Liquid-Crystalline Materials Used Having Different Color and Different Handedness of the Helical Structure Using liquid-crystalline materials prepared in accordance with Practical Example 2.7, coated support webs are prepared as described in Practical Example 3.16 and are processed further to give pigments as in EP 0 601 483, Example 1B. The pigments thus prepared are processed further in the screen printing process in accordance with Practical Example 3.21.

PRACTICAL EXAMPLE 3.57

Variant of Practical Example 3.56: Producing a Security Marking From Pigments of Liquid-Crystalline Material into Which Pigments of Liquid-Crystalline Material Have Been Incorporated, the Liquid-Crystalline Materials Used Having Different Color and Different Handedness of the Helical Structure Using liquid-crystalline materials prepared in accordance with Practical Example 2.7, coated support webs are prepared as described in Practical Example 3.16 and are processed further to give pigments as in EP 0 601 483, Example 1B. The pigments thus prepared are processed further into a polymer matrix in accordance with Practical Example 3.22.

PRACTICAL EXAMPLE 3.58

Producing a Security Marking Which Consists of a Three-Dimensional Arrangement of a Liquid-Crystalline Material in a Matrix, the Liquid-Crystalline Material Consisting of Pigments Applied by the Screen Printing Process The procedure as described in Practical Example 3.20 is repeated but, instead of the direct application of the liquid-crystalline material on the support film, pigments of liquid-crystalline material are applied by the screen printing process, as described in Practical Example 3.21.

PRACTICAL EXAMPLE 3.59

Producing a Security Marking Which Consists of a Three-Dimensional Arrangement of a Liquid-Crystalline Material in a Matrix, the Liquid-Crystalline Material Consisting of Pigments Incorporated into a Polymer Matrix The procedure as described in Practical Example 3.20 is repeated but, instead of the direct application of the liquid-crystalline material on the support film, pigments of liquid-crystalline material are incorporated into a polymer matrix, as described in Practical Example 3.22.

COMPARATIVE EXAMPLES

Detecting a Forged, Circular-Polarizing Element with an Arrangement Described in DE 39 42 663 A1, Page 10

Figure 13:
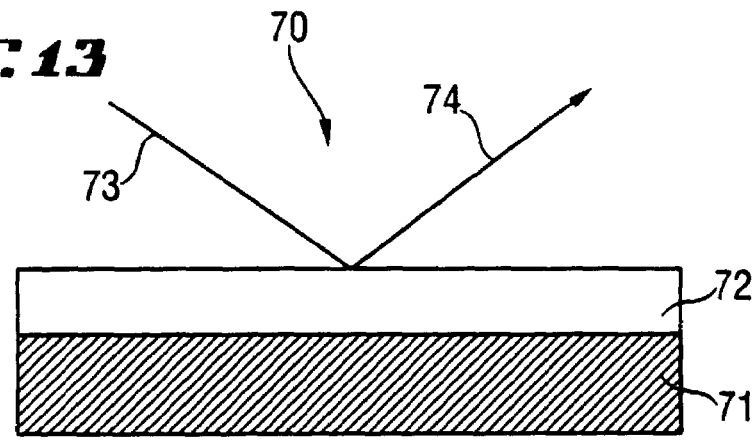
FIG. 13 shows a forged circular polarizing element.

The configuration of the forged, circular-polarizing element is shown in FIG. 13. A reflecting layer 71, for example, an aluminum foil or a mirrored area, is covered over with a circular-polarizing layer 72, for example, a commercially available circular-polarizing film consisting of ¼ film and a linear polarizer, the linear polarizer facing the reflecting layer.

Both components together form a circular-reflecting element whose bandwidth is generally much greater than that of cholesteric reflection bands.

On irradiation with a light source comprising unpolarized light 73, there is reflection of circular-polarized light 74 at this element, the component corresponding to the bandwidth of the color filter passes through said element, is converted by the ¼ film into linear-polarizing radiation and generates full intensity in one of the two detectors whereas the second detector receives no light. Even when the color flop is tested at a second angle, the forged element is recognized as genuine owing to the large bandwidth of the circular reflection. Consequently, a forged security element is erroneously recognized as genuine in the arrangement described in DE 39 42 663 on page 10.

The following Practical Examples 4.1-4.4 show by way of example how security markings can be tested mechanically for color, color flop and polarization in accordance with the claimed features.

PRACTICAL EXAMPLE 4.1

Testing a Security Marking of Type I1 with Test Setup TS1

A security marking SM1-1, as described in Tab. 1 under the group code I1, having a right-handed LC species which reflects in the IR spectral range is to be tested. The security marking was produced by whole-area application in accordance with Example 3.1. A test setup corresponding to TS1 is used. Testing is carried out for color and color flop in accordance with the procedure described under FP1-1 and for polarization in accordance with the description under PP1-1. The arrangement described under LU2 is used both times as illumination system B1 and B2. For detection D1 at the angle (b1) a detection system as described under DU1:is used and for detection D2 at the angle (b2) a detection system as described under DU3.

The measured signals are evaluated as follows: The signal levels of the respective measurement points of the security element are compared with the signal levels of a security marking produced in the same way (reference). For this purpose, the value of the measured variable at the respective position (center/flank) of the reflection band of the reference is taken as 100% and a deviation of the signal level of the security marking of ±10% in the center of the reflection band and ±25% at the flanks of the reflection band is permitted.

Signal levels of >90% and <110% are taken as =1, other signal levels as =0.

Table 3 shows the signals at the detection system when testing a security marking of the invention:

TABLE 3

| Illumination | Detection | Filter | Signal at D1 E1 (rh) | E2 (1h) | Signal at D2 D2 |
|---|---|---|---|---|---|
| at angle a1 | at angle b1 | F1 | 1 | 0 | |
| at angle a1 | at angle b1 | F2 | 1 | 0 | |
| at angle a1 | at angle b1 | F3 | 1 | 0 | |
| at angle a2 | at angle b2 | F4 | | | 1 |
| at angle a2 | at angle b2 | F5 | | | 1 |
| at angle a2 | at angle b2 | F6 | | | 1 |

Recognizing a Forged Security Marking:

A forged security marking is applied for testing to the test setup TS1 with the components as described. The forged security marking has the following configuration: marking with narrow reflection band of identical center wavelength and identical height, with comparable color flop, non-polarizing.

Table 4 shows the signals at the detection system when testing the forged security marking:

TABLE 4

| Illumination | Detection | Filter | Signal at D1 E1 (rh) | E2 (1h) | Signal at D2 D2 |
|---|---|---|---|---|---|
| at angle a1 | at angle b1 | F1 | 1 | 0 | |
| at angle a1 | at angle b1 | F2 | 1 | 0 | |
| at angle a1 | at angle b1 | F3 | 1 | 0 | |
| at angle a2 | at angle b2 | F4 | | | 1 |
| at angle a2 | at angle b2 | F5 | | | 1 |
| at angle a2 | at angle b2 | F6 | | | 1 |

Even a forged security marking with broad reflection band and a lower level but the same center wavelength, without color flop and with right-handed circular-polarization, is recognized as such:

Table 5 shows the signals at the detection system when testing the forged security marking:

TABLE 5

| Illumination | Detection | Filter | Signal at D1 E1 (rh) | E2 (1h) | Signal at D2 D2 |
|---|---|---|---|---|---|
| at angle a1 | at angle b1 | F1 | 0 | 0 | |
| at angle a1 | at angle b1 | F2 | 0 | 0 | |
| at angle a1 | at angle b1 | F3 | 0 | 0 | |
| at angle a2 | at angle b2 | F4 | | | 0 |
| at angle a2 | at angle b2 | F5 | | | 0 |
| at angle a2 | at angle b2 | F6 | | | 0 |

Other combinations, derived from deviating form of the reflection band, deviating color flop and deviating polarization characteristic, are also recognized as forged security markings.

Mention may be made by way of example of other liquid-crystalline security elements which are recognized as false: unpolarized element, broad band, with color flop; unpolarized element, narrow band, without color flop; unpolarized element, narrow band, with color flop; linear-polarized element, broad band, without color flop; linear-polarized element, broad band, with color flop; linear-polarized element, narrow band, without color flop; linear-polarized element, narrow band, with color flop; circular-polarized element, narrow band, without color flop.

A circular-polarized element with broad band and with color flop is recognized-as false if it lacks an identical form of the reflection band and the same wavelength shift under oblique illumination. This condition is only met if the forgery consists of the same material as the security marking that is to be forged.

A circular-polarized element with narrow band and with color flop is recognized as false if it lacks an identical form of the reflection band and identical wavelength shift under oblique illumination. This condition is only met if the forgery consists of the same material as the security marking to be forged.

PRACTICAL EXAMPLE 4.2

Testing a Security Marking of Type I1 with Test Setup TS2

A security marking SM1-2 as described in Tab. 1 under the group code I1 having a right-handed LC species which reflects in the IR spectral range is tested. The security marking was produced by whole-area application according to Example 3.1.

A test setup in accordance with TS2 is used. The arrangement described under LU2 is used both times as illumination system B1 and B2. Detection of D1, D2, D3 and D is carried out in each case using a detection system as described under DU6.

Ascertaining the signal level at the detection system is carried out by comparing the security marking that is to be detected with a master.

The signal levels of the reflection band are standardized at the value=1 on identity, tolerating a fluctuation band of 20% between master and security element to be tested. Other signal levels are set at the value=0.

Table 6 shows the signals at the detection system when testing the security marking of the invention:

TABLE 6

| | Signal at the detectors | | | |
|---|---|---|---|---|
| Security marking | D1 | D2 | D3 | D4 |
| SM 1-2 | 1 | 0 | 1 | 0 |

Recognition of Forged Security Markings:

Forged security markings are supplied for testing to the test setup TS2 with the components as described.

The forged security markings have the following configuration:
1. Forged security marking FM 1-2 with a nonpolarizing reflecting element and with reflection properties otherwise identical with I1.
2. Forged security marking FM 2-2 with a linear-polarizing reflecting element and with reflection properties otherwise identical with I1.
3. Forged security marking FM 3-2 with a circular-polarizing reflecting element with twice the bandwidth but the same handedness.

Table 7 shows the signals at the detectors when testing the forged security markings:

TABLE 7

| | Signal at the detectors | | | |
|---|---|---|---|---|
| Forged element | D1 | D2 | D3 | D4 |
| FM 1–2 | 0 | 0 | 0 | 0 |
| FM 2–2 | 0 | 0 | 0 | 0 |
| FM 3–2 | 0 | 0 | 0 | 0 |

PRACTICAL EXAMPLE 4.3

Testing a Security Marking of Type III3 with Test Setup TS3

A security marking SM1-3 as described in Tab. 1 under the group code III3 having 2 LC species reflecting in the IR spectral region, these being LC species 1 with color 1 and right-handed polarization, and LC species 2 with color 2 and left-handed polarization, is tested. The security marking was produced from pigments in accordance with Example 3.33. A test setup corresponding to TS3 is used. Testing is carried out for color and color flop in accordance with the procedure described under FP1-3 and for polarization in accordance with the description under PP1-3. Since there are two different colors, FP1-3 must be employed separately for each color. Both colors are measured at the same angles. The arrangement described under LU5 is used in each case as illumination system B1, B2 and B3.

For detection D1 at the angle (b1) use is made of a detection system as described under DU1, and for detection D2 at the angle (b2) a detection system as described under DU3. For detection D1 and D3 at the angles (b1) and (B3) use is made of detection systems as described under DU3. The security marking is illuminated and detected in an area such that both LC species are detected simultaneously and with comparable areal proportions.

The evaluation of the measured signals is as described in Practical Example 4.1.

Table 8 shows the signals at the detection system when testing the security marking of the invention:

TABLE 8

| | | | Signal at the detectors | | | |
|---|---|---|---|---|---|---|
| Illumination | Detection | Filter | D1 | E1 (rh) | E2 (lh) | D3 |
| at angle a1 | at angle b1 | F1 for color 1 | 1 | | | |
| | | F1 for color 2 | 1 | | | |
| at angle a2 | at angle b2 | F2 for color 1 | | 1 | 0 | |
| | | F2 for color 2 | | 0 | 1 | |
| at angle a3 | at angle b3 | F3 for color 1 | | | | 1 |
| | | F3 for color 2 | | | | 1 |

Recognizing a Forged Security Marking:

The test setup PS2 with the components as described is supplied with a forged security marking for testing. The forged security marking FM1-2 differs from the security marking SM1-3 in that the two colors are present in the same handedness of polarization: right-handed, for example.

Table 9 shows the signals at the detection system when testing the forged security marking:

TABLE 9

| | | | Signal at the detectors | | | |
|---|---|---|---|---|---|---|
| Illumination | Detection | Filter | D1 | E1 (rh) | E2 (lh) | D3 |
| at angle a1 | at angle b1 | F1 for color 1 | 1 | | | |
| | | F1 for color 2 | 1 | | | |
| at angle a2 | at angle b2 | F2 for color 1 | | 1 | 0 | |
| | | F2 for color 2 | | 1 | 0 | |
| at angle a3 | at angle b3 | F3 for color 1 | | | | 1 |
| | | F3 for color 2 | | | | 1 |

PRACTICAL EXAMPLE 4.4

Testing a Security Marking of Type II with Test Setup TS4

Figure 14:
FIG. 14 shows an inventive security marking in test setup 4.

A structured security marking 5, SM1-4, in accordance with FIG. 14, as described in Tab. 1 under the group code II1, consisting of two LC species with the same reflection bands in UV and with different polarization, is tested.

Figure 15:
FIG. 15 shows a forged security marking in test setup 4.

The security marking 5 was produced by screen printing of pigments in accordance with Example 3.23. A test setup corresponding to TS4 is used with the angular configurations (a1=b1) and (a2=2). The lighting unit described under LU6 is used in each case as illumination system B1 and B2. Detection in D1 and D2 is carried out using in each case the detection unit DU7. The filter selection for D1 and D2 is made in accordance with the criteria FP1-1 from TS1. Recognizing a Forged Security Marking 80:

The forged security marking 80, FM 14, differs from the security marking SM1-4 in that it is falsely structured relative to SM1-4 (see FIG. 15). Otherwise, however, it is prepared from the same LC species as SM1-4.

The forged security marking FM2-4 differs from the security marking SM1-4 in that it consists of two species with right- and left-handedly circular light reflection in the same spectral range as SM1-4 but with spectrally broadened reflection. The structuring is as for SM12.

Table 10 shows the signals at the detection system when testing the genuine and the forged security markings:

TABLE 10

| | Detection in D1 | | | | | |
|---|---|---|---|---|---|---|
| Filter | F1 | | F2 | | F3 | |
| Polarization | rh | 1h | rh | 1h | rh | 1h |
| SM1-4 | 1 | 1 | 1 | 1 | 1 | 1 |
| FM1-4 | 1 | 1 | 0 | 0 | 1 | 1 |
| FM2-4 | 0 | 0 | 1 | 1 | 0 | 0 |
| | Decection in D2 | | | | | |
| Filter | F4 | | F5 | | F6 | |
| Polarization | rh | 1h | rh | 1h | rh | 1h |
| SM1-4 | 1 | 1 | 1 | 1 | 1 | 1 |
| FM1-4 | 1 | 1 | 0 | 0 | 1 | 1 |
| FM2-4 | 0 | 0 | 1 | 1 | 0 | 0 |

What is claimed is:

1. A security marking useful for detecting forgery, said security marking comprising at least two invisible liquid crystalline materials with chiral phase and having no color in the visible region observable by the eye, said invisible liquid crystalline material detectable with the aid of a detection system, wherein said two invisible liquid crystalline materials have central wavelengths of their reflection spectrum which differ by more than 1%, or bandwidths of their reflection band which differ by more than 2%, and have opposite handedness.

2. The security marking as claimed in claim 1, wherein said invisible liquid-crystalline materials with chiral phase are selected such that the longwave flank of the reflection band of the liquid-crystalline material with chiral phase lies in the range from 200 to 420 nm or the shortwave flank of the reflection band of the liquid-crystalline material with chiral phase lies in the range from 700 to 3000 nm.

3. The security marking of claim 1, wherein said security marking is on a substrate.

4. The security marking of claim 3, wherein said security marking is a structured security marking having a first area containing one of said at least two invisible liquid crystalline materials and a second area containing a second of said at least two invisible liquid-crystalline materials.

5. The security marking of claim 4, wherein said first area and said second area are coplanar.

6. The security marking of claim 5, wherein said first area and said second area comprise parallel stripes or together constitute a geometric pattern.

7. The security marking of claim 3, wherein at least one invisible liquid-crystalline material is present in a first layer, and at least a second invisible liquid crystalline material is present in a second layer above said first layer.

8. An article having thereon at least one security marking of claim 1.

9. A process for the preparation of an article having a security marking thereon, said process comprising applying to an article the security marking of claim 1.

10. The process of claim 9, wherein at least two invisible liquid-crystalline materials with chiral form are employed, and each is ground into pigment particles prior to applying to said article in admixture.

11. The process of claim 9, wherein said article is selected from the group consisting of data carriers, non-monetary documents, identity cards, and paper currency.

12. A security system comprising an article carrying a security marking comprising at least one invisible liquid crystalline material with chiral phase, having no color in the visible region observable by the eye and having a reflection band, and a test setup for recognizing said at least one security marking by identification of a characteristic form of the reflection band of said visible liquid-crystalline material, said characteristic form being measured at at least two spectrally different points on the reflection band of said invisible liquid-crystalline material, wherein at least one spectral point corresponds to the peak of the reflection band at a given condition of light incidence and reflection, and a second spectral point corresponds to a wavelength wherein the intensity of the reflection band has fallen to from 10% to 50% of the intensity of the peak of the reflection band.

* * * * *